US008167699B2

(12) United States Patent
Inamura

(10) Patent No.: US 8,167,699 B2
(45) Date of Patent: May 1, 2012

(54) GAMING MACHINE

(75) Inventor: Yukinori Inamura, Tokyo (JP)

(73) Assignee: Universal Entertainment Corporation, Koto-Ku, Tokyo (JP)

( * ) Notice: Subject to any disclaimer, the term of this patent is extended or adjusted under 35 U.S.C. 154(b) by 639 days.

(21) Appl. No.: 12/176,691

(22) Filed: Jul. 21, 2008

(65) Prior Publication Data

US 2009/0156290 A1 Jun. 18, 2009

Related U.S. Application Data

(60) Provisional application No. 61/013,407, filed on Dec. 13, 2007.

(51) Int. Cl.
*A63F 13/00* (2006.01)

(52) U.S. Cl. ........................................... 463/16; 463/20

(58) Field of Classification Search .................... 463/16, 463/19–30, 40–42; 273/292, 138.1
See application file for complete search history.

(56) References Cited

U.S. PATENT DOCUMENTS

| | | | | |
|---|---|---|---|---|
| 5,288,081 A * | 2/1994 | Breeding | 273/292 |
| 6,273,424 B1 * | 8/2001 | Breeding | 273/292 |
| 7,559,837 B1 * | 7/2009 | Yoseloff et al. | 463/21 |
| 7,690,996 B2 * | 4/2010 | Iddings et al. | 463/42 |
| 7,758,416 B2 * | 7/2010 | Randall | 463/20 |
| 7,785,188 B2 * | 8/2010 | Cannon | 463/20 |
| 7,787,972 B2 * | 8/2010 | Schlottmann et al. | 700/91 |
| 7,824,267 B2 * | 11/2010 | Cannon et al. | 463/42 |
| 7,857,693 B1 * | 12/2010 | Johnson et al. | 463/13 |
| 2004/0102243 A1 * | 5/2004 | Olsen | 463/25 |
| 2005/0181856 A1 * | 8/2005 | Cannon et al. | 463/16 |
| 2005/0239525 A1 | 10/2005 | Sato | |
| 2009/0117969 A1 * | 5/2009 | Englman | 463/20 |
| 2009/0117970 A1 * | 5/2009 | De Waal et al. | 463/20 |

* cited by examiner

*Primary Examiner* — Masud Ahmed

(74) *Attorney, Agent, or Firm* — Lexyoume IP Group, PLLC.

(57) ABSTRACT

A gaming machine includes plural stations and a processor. Each station can determine a game result and execute a game independently. The processor accepts each station's entry to an event game when a predetermined condition is satisfied. An event game consists of a plural number of unit event games. When executing unit event games, the processor collects a game charge from a station whose entry to the event game has been accepted.

3 Claims, 17 Drawing Sheets

FIG. 11

| WINNING COMBINATION | PAYOUT AMOUNT |
|---|---|
| BLUE 7 - BLUE 7 - BLUE 7 | 1000 |
| RED 7 - RED 7 - RED 7 | 100 |
| ANY 7 - ANY 7 - ANY 7 | 80 |
| 3-BAR - 3-BAR - 3-BAR | 60 |
| 2-BAR - 2-BAR - 2-BAR | 40 |
| BAR - BAR - BAR | 20 |
| ANY BAR - ANY BAR - ANY BAR | 10 |

FIG. 14

| CODE NUMBER | SYMBOL |
|---|---|
| 00 | BLANK |
| 01 | RED 7 |
| 02 | BAR |
| 03 | BLANK |
| 04 | BLUE 7 |
| 05 | BLANK |
| 06 | BLANK |
| 07 | 2-BAR |
| 08 | BAR |
| 09 | BLANK |
| 10 | 3-BAR |
| 11 | BAR |
| 12 | BLANK |
| 13 | RED 7 |
| 14 | BLANK |
| 15 | BLANK |
| 16 | 3-BAR |
| 17 | BAR |
| 18 | BLANK |
| 19 | BLUE 7 |
| 20 | 3-BAR |
| ⋮ | ⋮ |

FIG. 15

| RANDOM NUMBER VALUE | CODE NUMBER |
|---|---|
| 0~127 | 00 |
| 128~255 | 01 |
| 256~383 | 02 |
| 384~511 | 03 |
| 512~760 | 04 |
| 761~767 | 05 |
| 768~895 | 06 |
| 896~1023 | 07 |
| 1024~1151 | 08 |
| 1152~1279 | 09 |
| 1280~1307 | 10 |
| 1308~1335 | 11 |
| 1336~1364 | 12 |
| 1365~1491 | 13 |
| 1492~1919 | 14 |
| 1920~2047 | 15 |
| 2048~2175 | 16 |
| 2176~2303 | 17 |
| 2304~2431 | 18 |
| 2432~2559 | 19 |
| 2560~2687 | 20 |
| ⋮ | ⋮ |

FIG. 17

| SYMBOL | EVENT POINT |
|---|---|
| BLUE 7 | 100 |
| RED 7 | 50 |
| 3-BAR | 30 |
| 2-BAR | 20 |
| BAR | 10 |
| BLANK | 0 |

GAMING MACHINE

CROSS-REFERENCE TO RELATED APPLICATIONS

This application is based upon and claims a priority from the U.S. provisional Patent Application No. 61/013,407 filed on Dec. 13, 2007, the entire contents thereof are incorporated herein by reference.

BACKGROUND

1. Technical Field

The present invention encompassing one or more aspects thereof relates to a gaming machine comprised of a plurality of stations. More particularly, it relates to a gaming machine wherein a game result is determined and a game can be executed independently for each of the stations.

2. Description of Related Art

Various gaming machines have conventionally been installed in game arcades and the like. As one of the examples of them, stand-alone-type gaming machines have been available. In such stand-alone-type gaming machines, a game result is determined for a gaming machine separately, i.e., a game for the single gaming machine is executed separately from games for other gaming machines. That is, a game for this type of gaming machine can go with a single gaming machine (i.e., a processor for determining a game result) and a player seated thereat. This type of gaming machine has ordinarily been installed in game arcades, which makes it difficult to create players' novel attraction toward game.

As one aspect of gaming machines to be installed in game arcades and the like, a gaming machine comprised of a plurality of consoles has been available. In such a gaming machine, a game (e.g., baccarat, poker, and the like) is executed with a player seated at each of the plurality of consoles and a processor. That is, in the gaming machine, the processor determines a game result common to each of the plurality of consoles. For example, in case of baccarat, the processor determines a game result from any one of choices, namely, "TIE", "BANKER" and "PLAYER" so as to serve as a dealer. Players anticipate a game result to be determined by the processor and carry out bet operation using gaming values at their respective consoles. In case the game result coincides with an anticipation on which a player has bet, the player can win a predetermined valued prize.

That is, the gaming machine comprised of the plurality of the consoles executes a game with each of the players and the processor, similar to the stand-alone-type gaming machine. In this regard, in the gaming machine comprised of the plurality of the consoles, a plurality of players seated at their respective consoles share a game result. However, the share of a single game result with plural players does not create novel characteristics of a game to be executed with the gaming machine. That is, characteristics of a game executed with the gaming machine comprised of the plurality of the consoles are as ordinary as those of a game executed by a stand-alone-type gaming machine.

The object of the present invention is to provide a gaming machine capable of executing a game of which characteristics are novel to characteristics of conventional games and also capable of collecting a value for an execution of a game (i.e. a game charge).

SUMMARY

Therefore, in order to achieve the object, according to a gaming machine of the present invention encompassing one or more aspects thereof, there is provided a gaming machine. The gaming machine comprises plural stations and a processor. Each of the plural stations determines a game result and executes a base game independently. When a predetermined condition is satisfied, the processor accepts each station's entry to an event game. The event game is a game to be executed in common at plural stations wherein each of the plural stations determines the game result independently. The processor collects an exchange for an execution of the event game (i.e., a game charge) from plural stations of which entries to the event game have been accepted. Next, the processor executes the event game in a station of which game charge has been collected. As a result, the gaming machine provides a new interest of the game that is different from the base game, and collects the game charge.

According to the present invention encompassing one or more aspects, there is provided a gaming machine. The gaming machine comprises plural stations and a processor. Each of the plural stations determines a game result and executes a base game independently. When a predetermined condition is satisfied, the processor accepts each station's entry to an event game. The event game is a game in which each station determines the game result independently, and consists of a plural number of unit games executed in common at plural stations. The processor collects an exchange for an execution of the unit game that composes the event game (i.e., a game charge) from plural stations of which entries to the event game have been accepted. Next, the processor executes the unit game in a station of which game charge has been collected. As a result, the gaming machine provides a new interest of the game that is different from the base game, and collects the game charge, every execution of the unit game.

Furthermore, according to the present invention encompassing one or more aspects, there is provided a gaming machine. The gaming machine comprises plural stations and a processor. Each of the plural stations determines a game result and executes a base game independently. When a predetermined condition is satisfied, the processor accepts each station's entry to an event game. The event game is a game in which each station determines the game result independently, and consists of a plural number of unit games executed in common at plural stations. The processor collects an exchange for an execution of the unit game that composes the event game (i.e., a game charge) from plural stations of which entries to the event game have been accepted. Next, the processor executes the unit game in a station of which game charge has been collected. When the event game is finished, the processor awards a special prize to each station participated to the event game based on an event game result. As a result, the gaming machine provides a player with a game including game aspects that conventional ones did not have, and a new interest of the game that is different from the base game. Furthermore, the gaming machine collects the game charge, every execution of the unit game.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

FIG. 11 is an explanatory view concerning a payout table of a gaming machine according to one embodiment of the present invention;

FIG. 14 is an explanatory view showing one example of tables which relates reel symbols to code numbers according to one embodiment of the present invention;

FIG. 15 is an explanatory view showing one example of tables which relates code numbers concerning reels to random number values, according to one embodiment of the present invention;

FIG. 17 is an explanatory view concerning an event game point table according to one embodiment of the present invention.

DETAILED DESCRIPTION OF THE PREFERRED EMBODIMENTS

Figure 1:
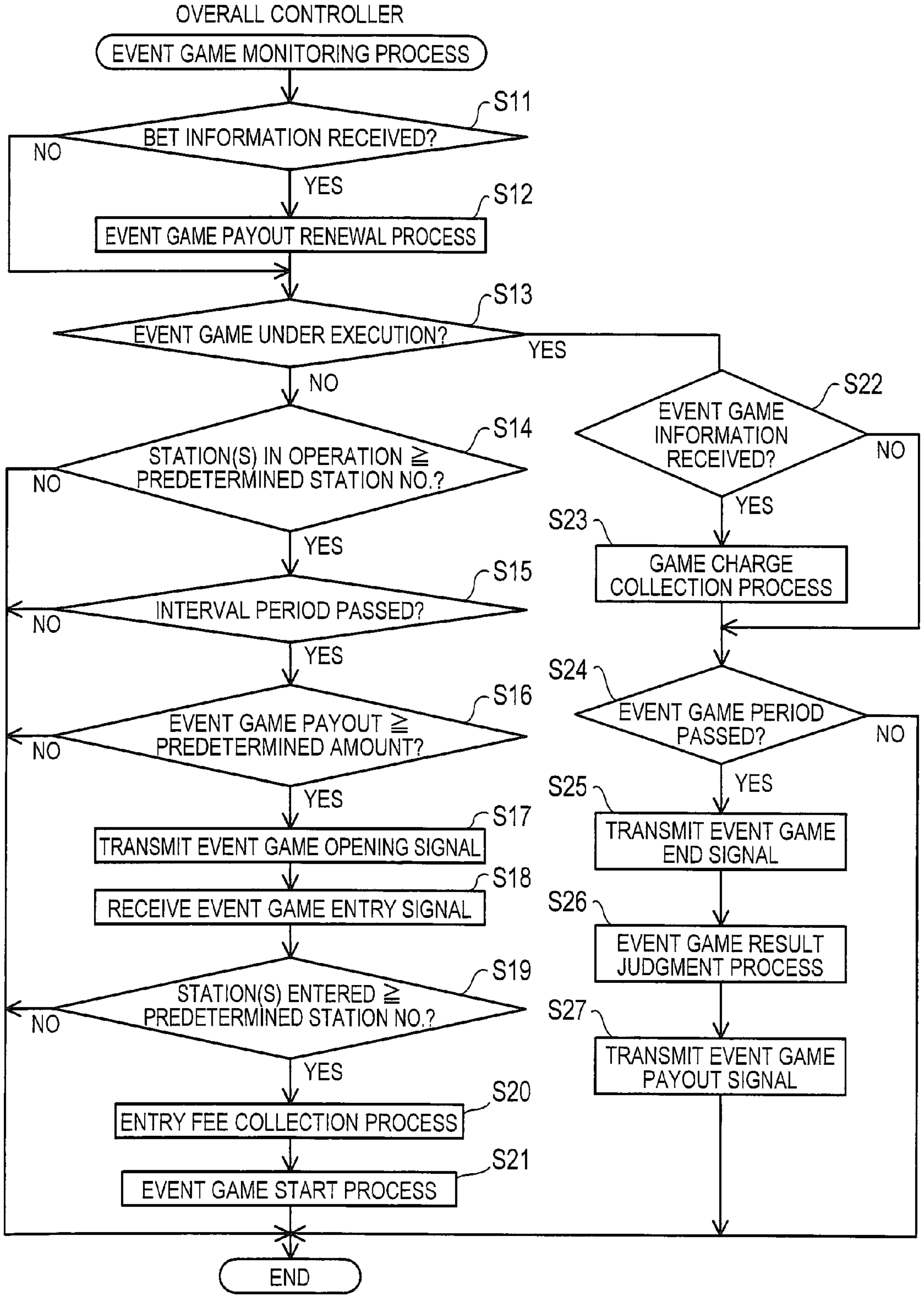
FIG. 1 is a flowchart of an event game monitoring process program according to one embodiment of the present invention.

The various aspects summarized previously may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

It is noted that various connections are set forth between items in the following description. It is noted that these connections in general and, unless specified otherwise, may be direct or indirect and that this specification is not intended to be limiting in this respect.

A gaming machine, a server, and a game system according to one or more aspects of the invention will be described in detail with reference to the drawings based on an embodiment embodying one or more aspects of the invention. However, it is appreciated that one or more aspects of the present invention may be embodied in distributable (via CD and the like) or downloadable software games, console games, and the like. In this regard, the slot machine may be a virtual slot machine that is displayed on a multi-purpose computer and/or dedicated kiosk. Aspects of the invention are described by way of hardware elements. However, it is appreciated that these elements may also be software modules that are executable in a computer. The software modules may be stored on a computer readable medium, including but not limited to a USB drive, CD, DVD, computer-readable memory, tape, diskette, floppy disk, and the like. For instance, aspects of the invention may be embodied in a JAVA-based application or the like that runs in a processor or processors. Further, the terms "CPU", "processor", and "controller" are inclusive by nature, including at least one of hardware, software, or firmware. These terms may include a portion of a processing unit in a computer (for instance, in multiple core processing units), multiple cores, a functional processor (as running virtually on at least one of processor or server, which may be local or remote). Further, in network-based gaming systems, the processor may include only a local processor, only a remote server, or a combination of a local processor and a remote server.

It is contemplated that one or more aspects of the invention may be implemented as computer executable instructions on a computer readable medium such as a non-volatile memory, a magnetic or optical disc. Further, one or more aspects of the invention may be implemented with a carrier signal in the form of, for instance, an audio-frequency, radio-frequency, or optical carrier wave.

Next, a detailed description will be given on the inventive gaming machine as embodied in a gaming machine 100 by referring to drawings.

A gaming machine 100 directed to the present embodiment is constituted of a plurality of stations 1 (for instance, five stations). In the gaming machine 100, each station 1 executes a base game independently. If predetermined conditions to be described later are satisfied, the gaming machine 100 accepts entry of each station 1 with respect to an event game. In this event game, stations 1 which have entered this event game compete to win an event game payout which is a progressive payout.

In the event game, each of the stations 1 which have entered the event game executes plural times of unit event game independently during a predetermined period (hereinafter referred to as event game period). The gaming machine 100 collects a game charge from the stations which have entered the unit event game. This game charge is collected as a counter value of an execution of a unit game.

Figure 2:
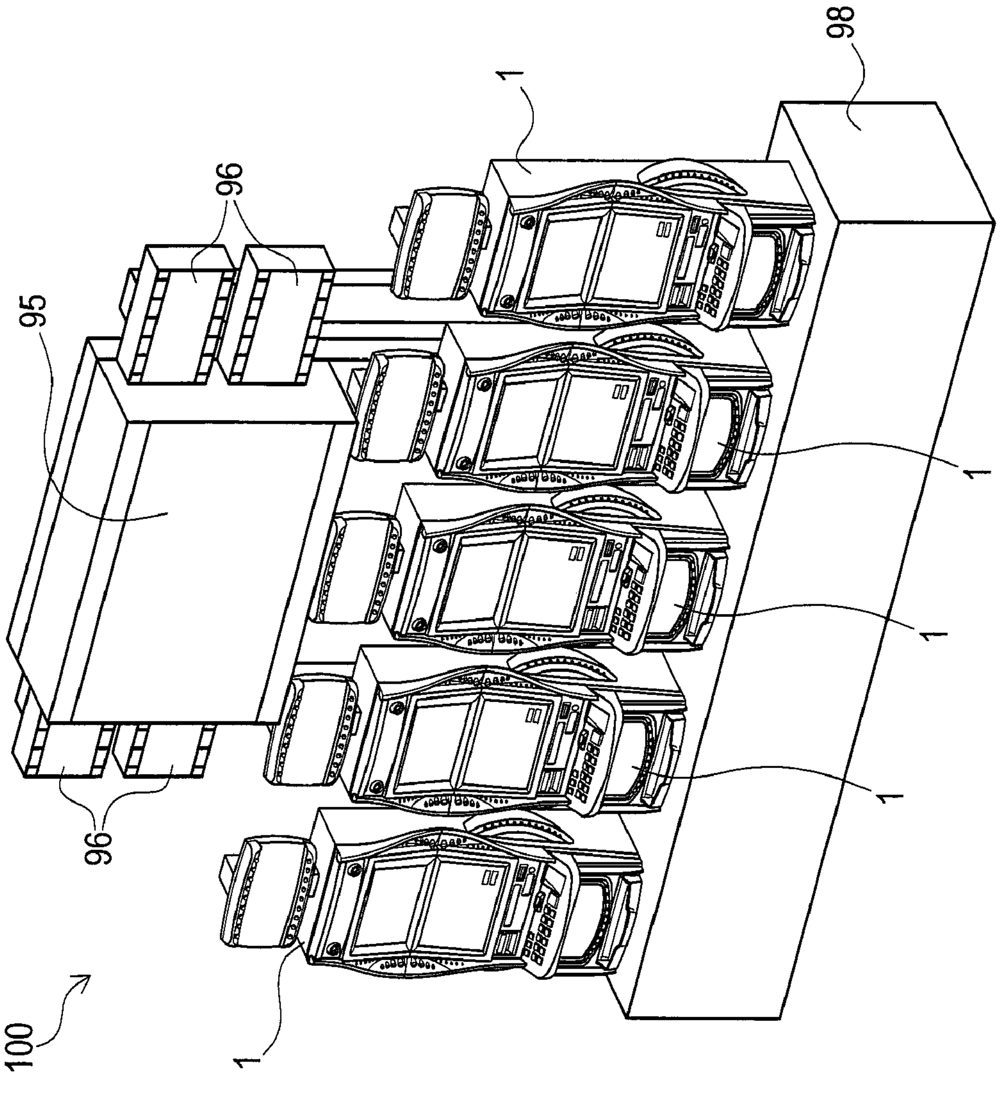
FIG. 2 is an external view of a gaming machine according to one embodiment of the present invention.

Here, a schematic construction of the gaming machine 100 directed to the present embodiment will be described by referring to the drawings. FIG. 2 is a perspective view showing an exterior appearance of the gaming machine 100 directed to the present embodiment.

As shown in FIG. 2, the gaming machine 100 has five stations 1. Stations 1 are all mounted in line on an installation base 98. In the gaming machine 100, players execute different types of games (i.e., the base game and the event game to be described later) using the respective stations 1. This installation base 98 houses an overall controller 91 and the like to be described later.

The gaming machine 100 also has a large display device 95 and a light emitting effect device 96. The large display device 95 and the light emitting effect device 96 are mounted above the five stations 1 installed on the installation base 98. The large display device 95 is a heretofore known large liquid crystal display and is adapted to display different types of game information (for instance, game rules and game score for each station 1, or the like) in the gaming machine 100. The light emitting effect device 96 has the effect of enhancing interest in the gaming machine 100 by emitting light in a predetermined fashion.

The large display device 95 and the light emitting effect device 96 are supported by a support member arranged at the back side of the installation base 98 (refer to FIG. 2). Specifically, stations 1 installed on the installation base 98 are spaced away from the large display device 95 and the light emitting effect device 96. Thus, according to the gaming machine 100, the manager, etc. of the game arcade can replace the stations 1 on the installation base 98 without the need to remove the large display device 95 and the light emitting effect device 96.

Figure 3:
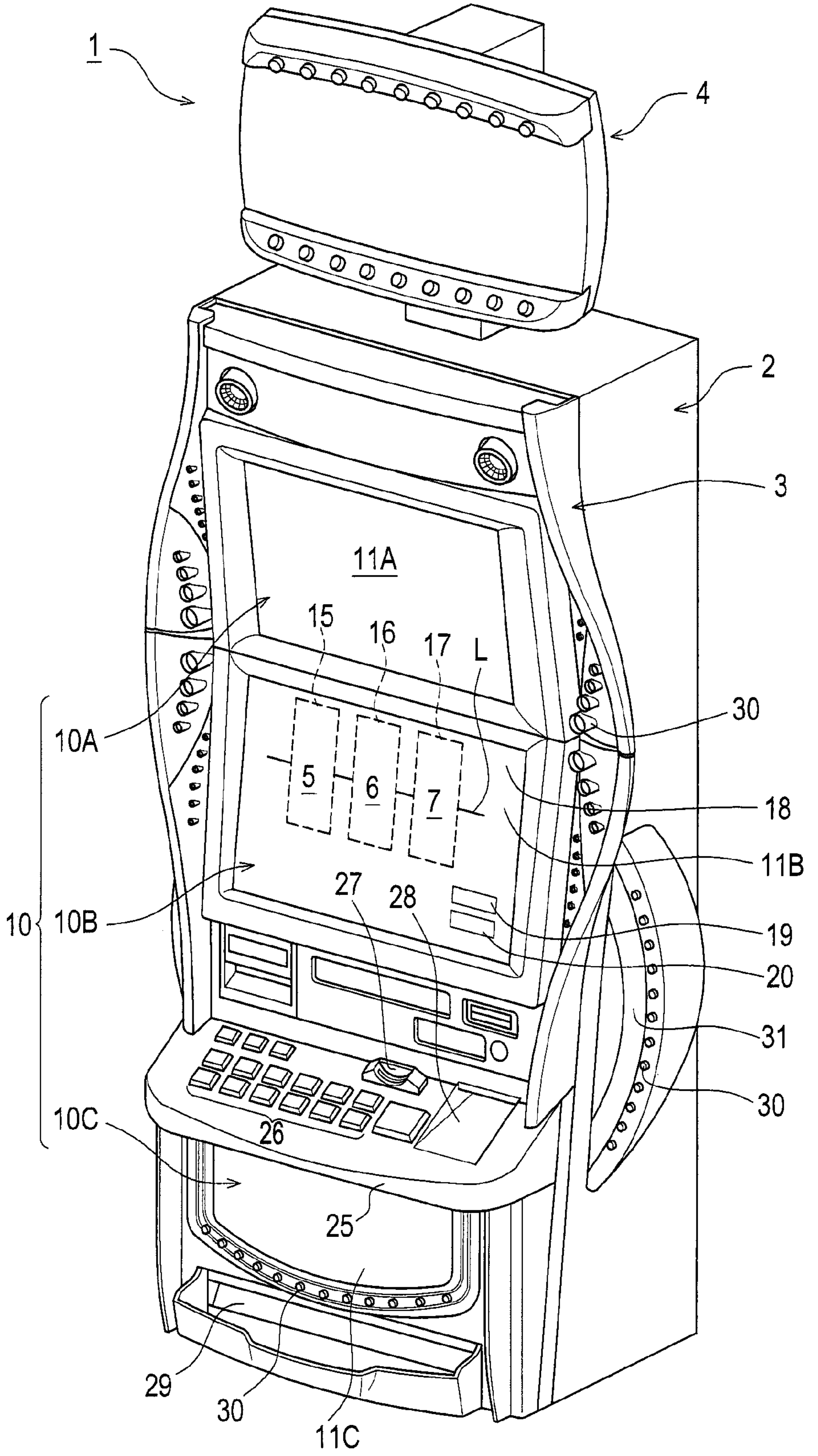
FIG. 3 is an external view of a station according to one embodiment of the present invention.

Next, stations 1 composing the gaming machine 100 directed to the present embodiment will be described in detail by referring to the drawings. FIG. 3 is a perspective view showing an external appearance of one station 1 composing the gaming machine 100.

Station 1 directed to the present embodiment is a so-called hybrid-type slot machine. This hybrid-type slot machine has a heretofore known transparent liquid crystal panel arranged at a front face of a plurality of mechanical reels that are rotatably supported. This hybrid-type slot machine displays images of different types of symbols drawn on an outer surface of the mechanical reels, while the transparent liquid crystal panel is in a transmission state upon execution of the game.

Station 1 directed to the present embodiment is an upright-type slot machine used in game arcades such as casinos and the like. This station 1 has a cabinet 2, a main door 3 and a topper effect device 4. The main door 3 is arranged at a front face of the cabinet 2. The topper effect device 4 is arranged at an upper side of the cabinet 2.

Cabinet 2 is a housing portion that houses the electrical and mechanical components for executing a predetermined game mode in station 1. Cabinet 2 has three reels (specifically, left reel 5, center reel 6 and right reel 7) which are rotatably provided therein. Reels 5 through 7 each have a symbol column drawn on an outer periphery thereof (refer to FIG. 5). The symbol column is constituted of a predetermined number of symbols (for instance, blue seven symbol 90A and the like to be described later). A main liquid crystal panel 11B to be described later is arranged in front of the reels 5 though 7.

The main door 3 has an upper display portion 10A, a variable display portion 10B and lower display portion 10C provided as a display portion 10 for displaying information with respect to the game. The upper display portion 10A is constituted of an upper liquid crystal panel 11A arranged above the variable display portion 10B. The upper liquid crystal panel 11A displays, for instance, effect images, introduction to game contents, explanation of game rules, and the like.

The variable display portion 10B is constituted of the main liquid crystal panel 11B and is adapted to display an execution state of the game. The main liquid crystal panel 11B is a heretofore known transparent liquid crystal panel secured to the main door 3.

Figure 9:
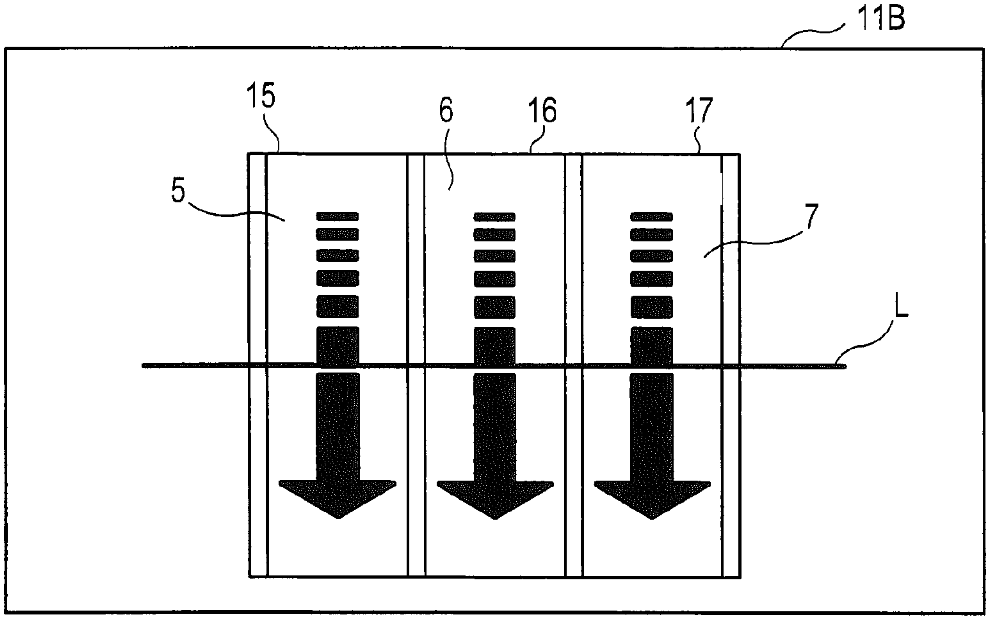
FIG. 9 is an explanatory view showing a display example of a main liquid crystal panel with scroll-displayed symbols thereon according to one embodiment of the present invention.

The main liquid crystal panel 11B has three display windows 15, 16 and 17 formed therein (refer to FIG. 3). Station 1 renders the back side of the display windows 15, 16 and 17 visible by placing these display windows in a transmission state. As a result, a player can visually recognize the symbols drawn on reels 5 through 7 via the respective display windows 15 through 17 (refer to FIG. 9 and FIG. 10).

As shown in FIG. 3, etc., one pay line L is displayed on the main liquid crystal panel 11B in the variable display portion 10B. This pay line L is a line that runs in a horizontal direction across a mid portion of the symbol display area corresponding to reels 5 through 7 and defines a symbol combination. Accordingly, if the symbol combination that was repositioned on the pay line L is a predetermined winning combination, the station 1 awards a payout in accordance with the winning combination and the credit amount that was bet (bet amount).

The number of reels may be five, instead of three, and further, the number of displayed symbols is not limited to nine symbols.

A touch panel 18 is provided at a front face of the main liquid crystal panel 11B. Thus, the player can input different types of commands by operating of the touch panel 18. In the present embodiment, the touch panel 18 is used at the time of an entry operation with respect to an event game to be described later.

A payout amount display portion 19 and a credit amount display portion 20 are provided at a right lower part of the variable display portion 10B. The payout amount display portion 19 displays the payout amount and the like as the awarded payout amount. The payout amount display portion 19 displays a payout amount which is awarded if the symbol combination repositioned on the pay line L in a base game is a predetermined combination. On the other hand, the credit amount display unit 20 displays the credit amount that an actual player has.

The lower display portion 10C is arranged below the variable display portion 10B. This lower display portion 10C is constituted of a plastic panel 11C onto which an image is printed. In the lower display portion 10C, the plastic panel 11C is illuminated by backlights.

An operation table 25 is provided at a front face of the cabinet 2. The operation table 25 is arranged between the variable display portion 10B and the lower display portion 10C so as to protrude towards the front side. A plurality of types of operation buttons 26 are arranged on this operation table 25. Operation buttons 26 include a BET button, a collecting button, a start button and a CASHOUT button and the like. The operation table 25 has a coin insertion slot 27 and a bill insertion portion 28. The coin insertion slot 27 accepts coins representing a gaming value inside the cabinet 2. The bill insertion slot 28 accepts bills inside the cabinet 2.

In the gaming machine 100 (i.e., including station 1) directed to the present embodiment, coins, bills or electronic valuable information (credit) corresponding to these are used as gaming values. However, the gaming values applicable to this invention are not limited to these items and may also include medals, tokens, electronic money or tickets, for instance.

Also, a coin tray 29 is provided at a lowermost portion of the cabinet 2. This coin tray 29 receives the coins paid out by a hopper 64. A light emitting portion 30 is arranged at a periphery of cabinet 2 in station 1. The light emitting portion 30 lights up in a predetermined lighting fashion in the event of a win or during the event game. A speaker 31 is provided at a side face of the cabinet 2 and is adapted to output sounds in accordance with the progress of the game.

Station 1 also has a topper effect device 4 provided at an upper side of cabinet 2. This topper effect device 4 has a rectangular board shape and is arranged so as to become substantially parallel with the upper display portion 10A.

Figure 4:
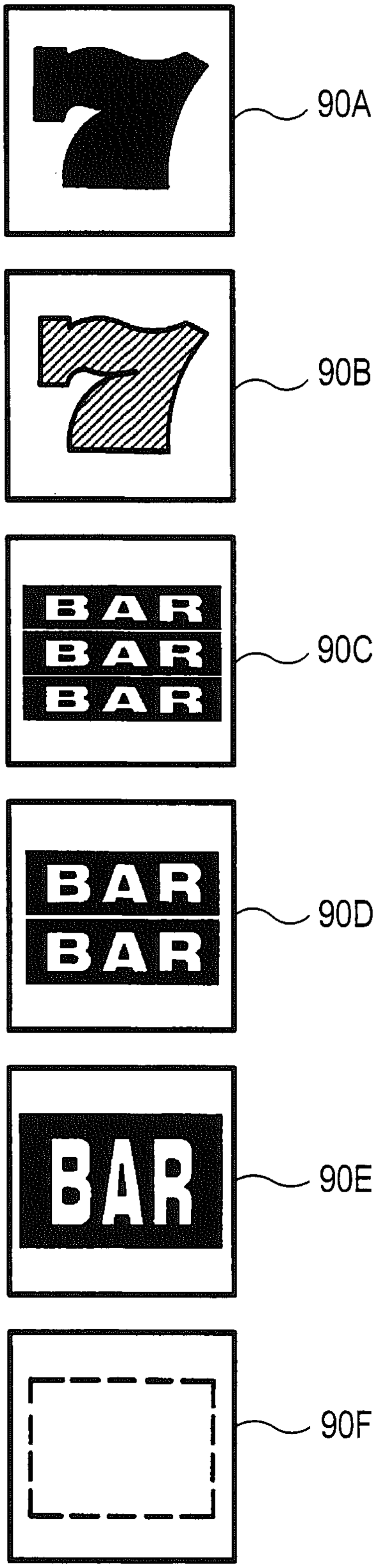
FIG. 4 is an explanatory view concerning a variety of symbols according to one embodiment of the present invention.

Next, the symbols in the gaming machine 100 directed to the present embodiment will be described by referring to the drawings. FIG. 4 is an explanatory diagram of the respective symbols employed by the gaming machine 100 directed to the present embodiment.

As shown in FIG. 4, the gaming machine 100 employs six types of symbols during the game. The six types of symbols are constituted of a blue seven symbol 90A (BLUE 7), a red seven symbol 90B (RED 7), a triple bar symbol 90C (3-BAR), a double bar symbol 90D (2-BAR), a bar symbol 90E (BAR) and a blank symbol 90F (BLANK).

Figure 5:
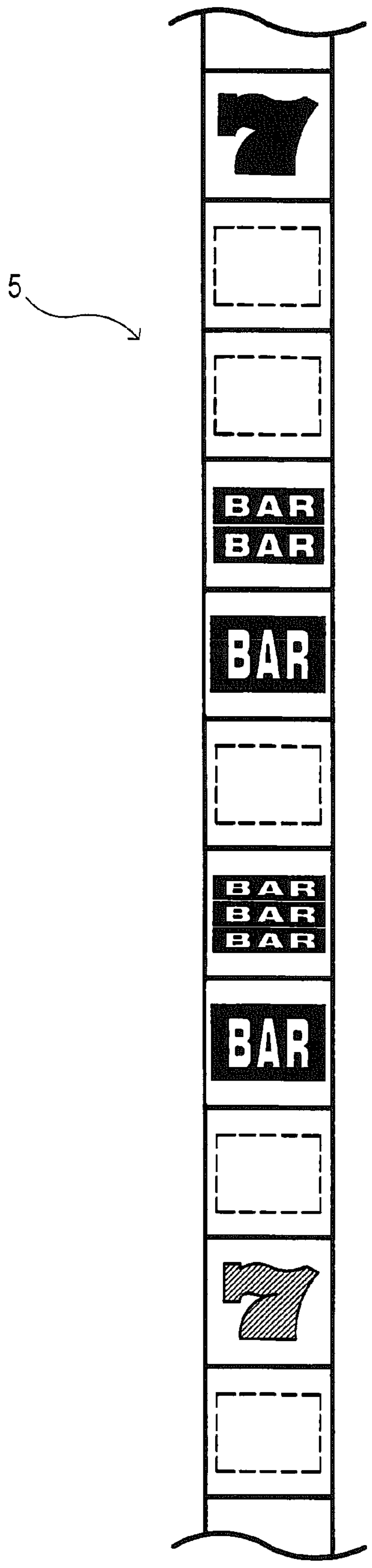
FIG. 5 is an explanatory view showing one example of a reel according to one embodiment of the present invention.

These six types of symbols constitute a symbol column when a predetermined number thereof are positioned in array (refer to FIG. 5). The reel bands of the left reel 5, the center reel 6 and the right reel 7 each contain a corresponding symbol column. In the symbol columns, the above described symbols are each positioned in a predetermined sequence. Accordingly, in the base game and the event game, station 1 can reposition the symbols while scrolling through the respective display windows 15 through 17 of the main liquid crystal panel 11B.

The blue seven symbol 90A through the bar symbol 90E constitute a winning combination if three of them are repositioned on the pay line L of the main liquid crystal panel 11B. In this case, the gaming machine 100 awards a predetermined payout amount to the player based on the relevant winning combination (refer to FIG. 11).

Figure 6:
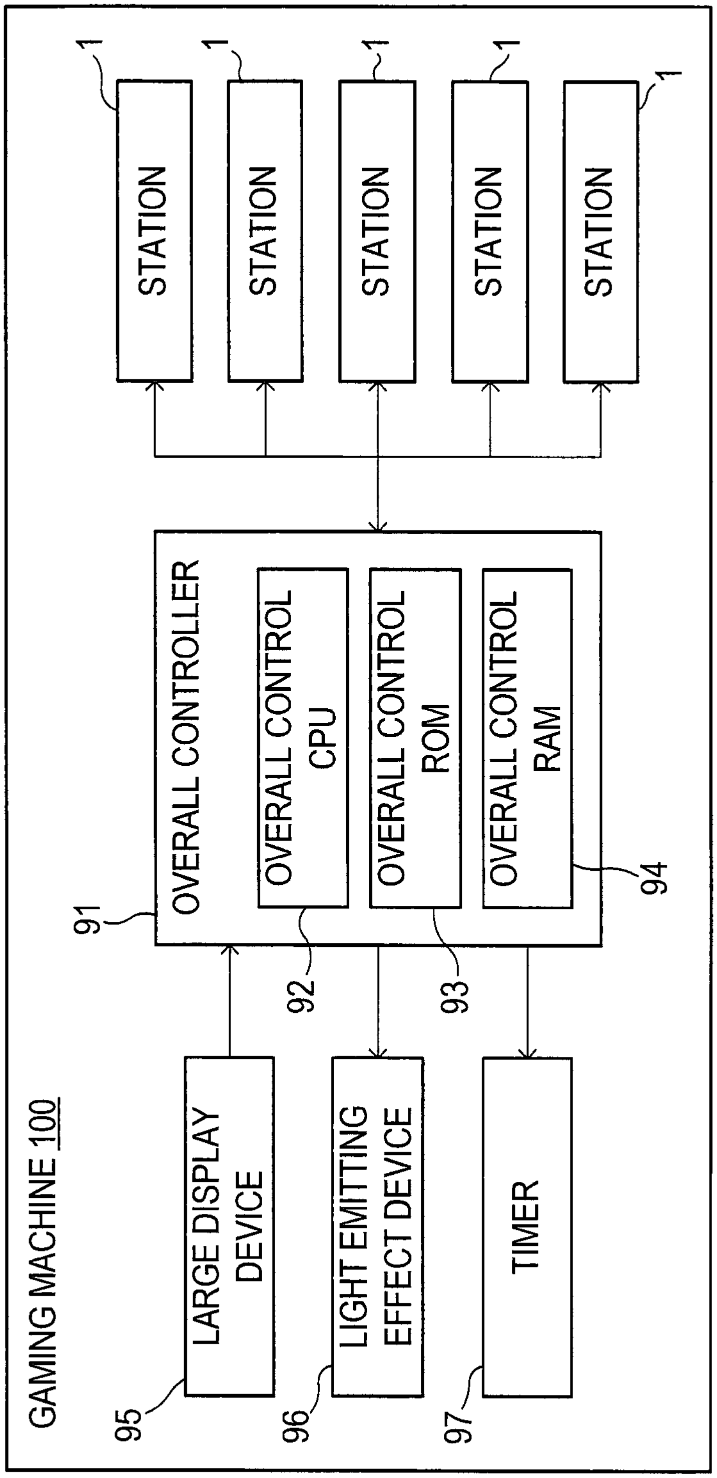
FIG. 6 is an explanatory view showing a control system of a gaming machine according to one embodiment of the present invention.

Next, the internal construction of the gaming machine 100 directed to the present embodiment will be described in detail by referring to the drawings. FIG. 6 is a block diagram showing an internal construction of the gaming machine 100.

As shown in FIG. 6, the gaming machine 100 is provided with an overall controller 91. This overall controller 91 executes a control program to be described later (for instance, an event game monitoring process program, etc.) to control the entire gaming machine 100. The overall controller 91 functions as a processor for the gaming machine directed to the present invention, together with controller 41 of each station 1.

The overall controller 91 is constituted of an overall control CPU 92, an overall control ROM 93 and an overall control RAM 94. The overall control ROM 93 stores a control program and a data table required for controlling the entire gaming machine 100. Accordingly, this overall control ROM 93 stores a main process program to be described later (refer to FIG. 12) and an event game monitoring process program (refer to FIG. 1) and the like. The overall control CPU 92 is a central processing unit that executes the various types of control programs stored in the overall control ROM 93. The overall control CPU 92 serves as the core for controlling the entire gaming machine 100.

The overall control RAM 94 temporarily stores the computed results and the like when the overall control CPU 92 executes a control program. This overall control RAM 94 also stores information with respect to an event game payout (for instance, information with respect to a payout amount). This event game payout is a progressive payout as will be described later. Accordingly, the information with respect to the event game payout of the overall control RAM 94 is renewed as needed upon reception of bet information and the like from each station 1.

The five stations 1 constituting the gaming machine 100 are each connected to the overall controller 91. Thus, the overall controller 91 can transmit and receive different types of data to/from each one of the five station 1. The overall controller 91 can thus control each station 1 based on the control program stored in the overall control ROM 93. Specifically, the overall controller 91 can control the event game with respect to the entire gaming machine 100 by executing an event game monitoring process program to be described later.

A timer 97 serving as a timing device is connected to the overall controller 91. This timer 97 is referenced when judging whether one of the event game start conditions is satisfied in an event game monitoring process program. This timer 97 is also referenced when judging the lapse of an event game execution period (hereinafter referred to as event game period).

Figure 7:
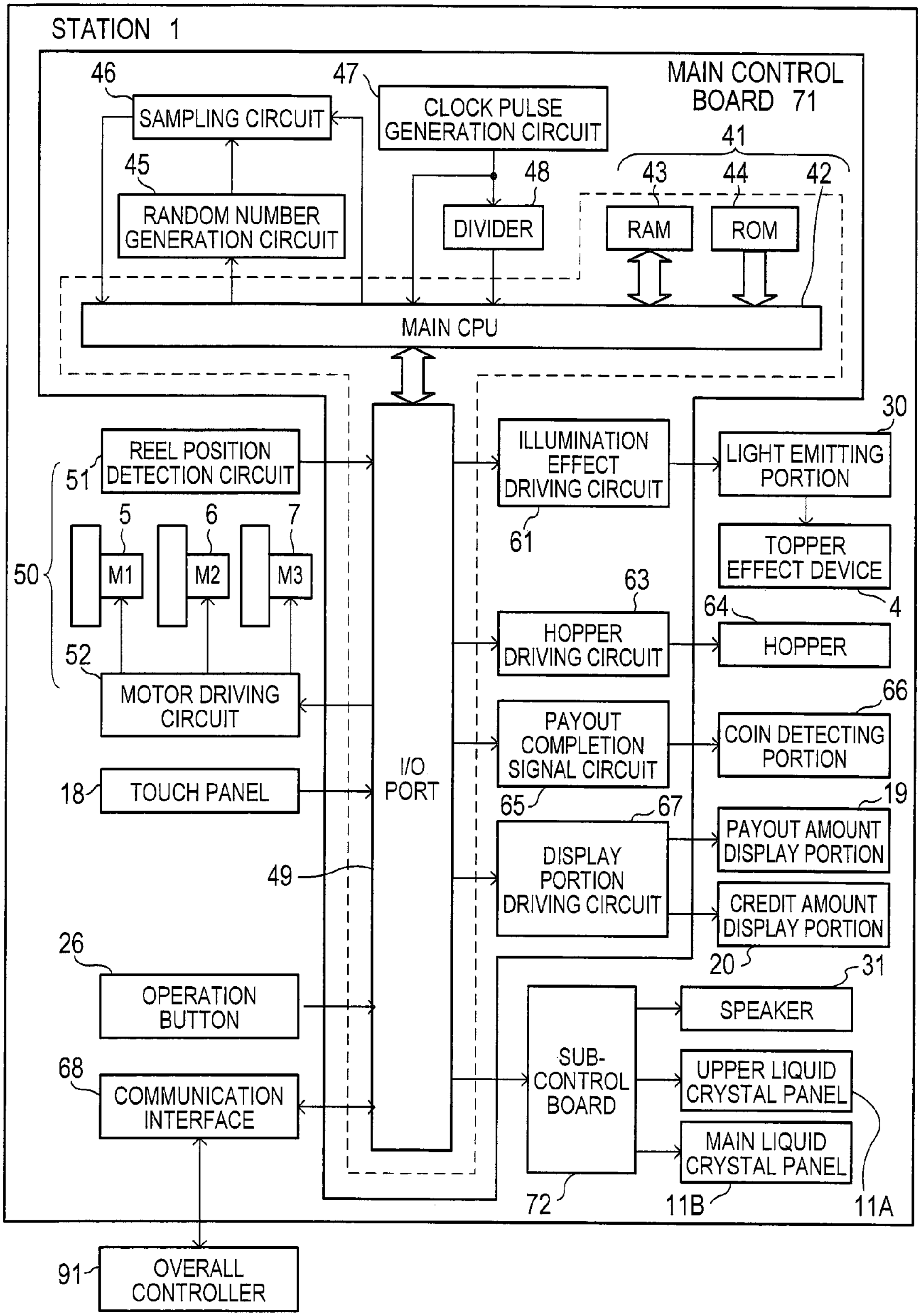
FIG. 7 is an explanatory view concerning a control system of a station according to one embodiment of the present invention.
Figure 8:
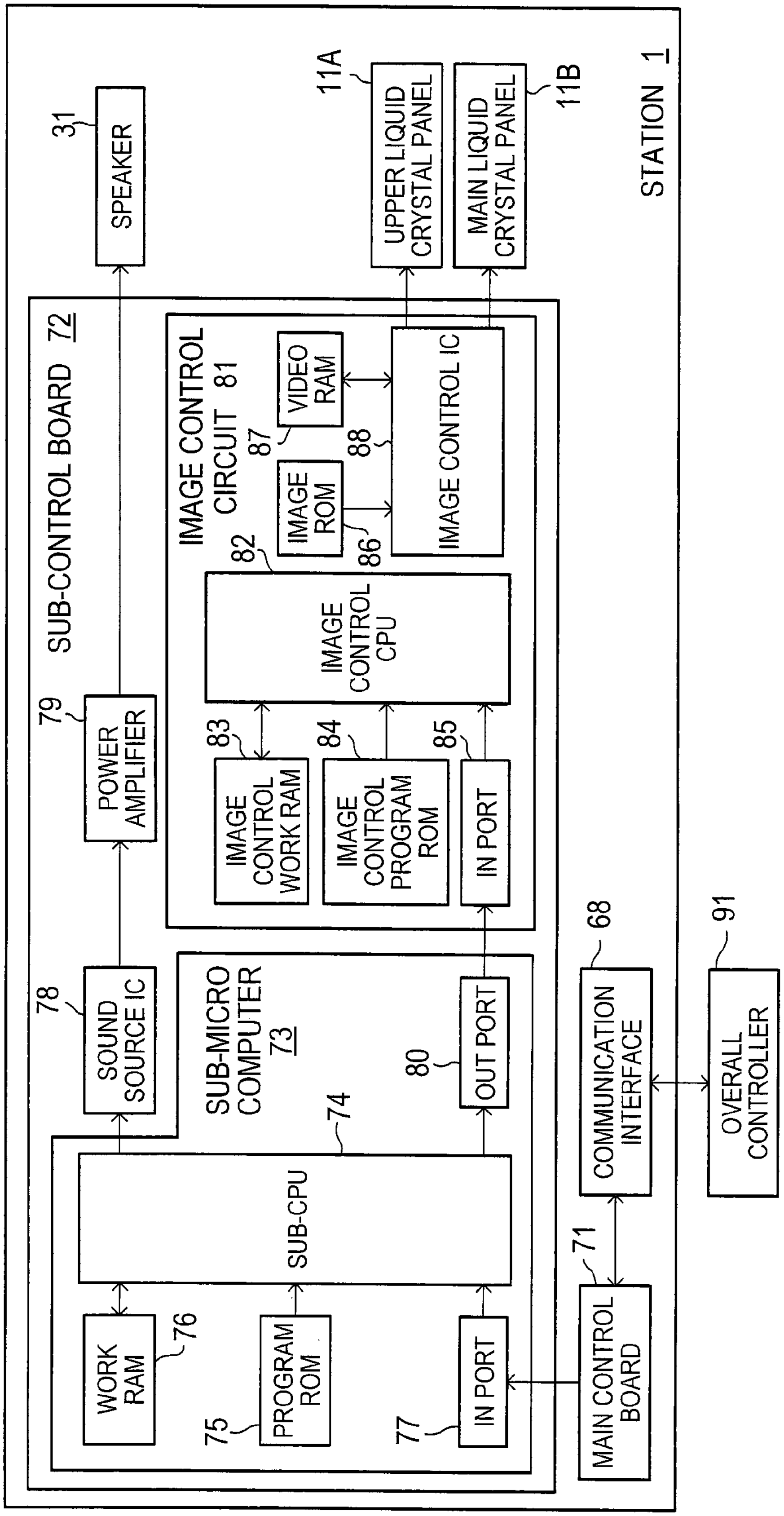
FIG. 8 is an explanatory view concerning a configuration of a sub-control board installed in a station according to one embodiment of the present invention.

Next, the internal construction of station 1 directed to the present embodiment will be described in detail by referring to the drawings. FIG. 7 is a block diagram showing the internal construction of station 1.

Figure 13:
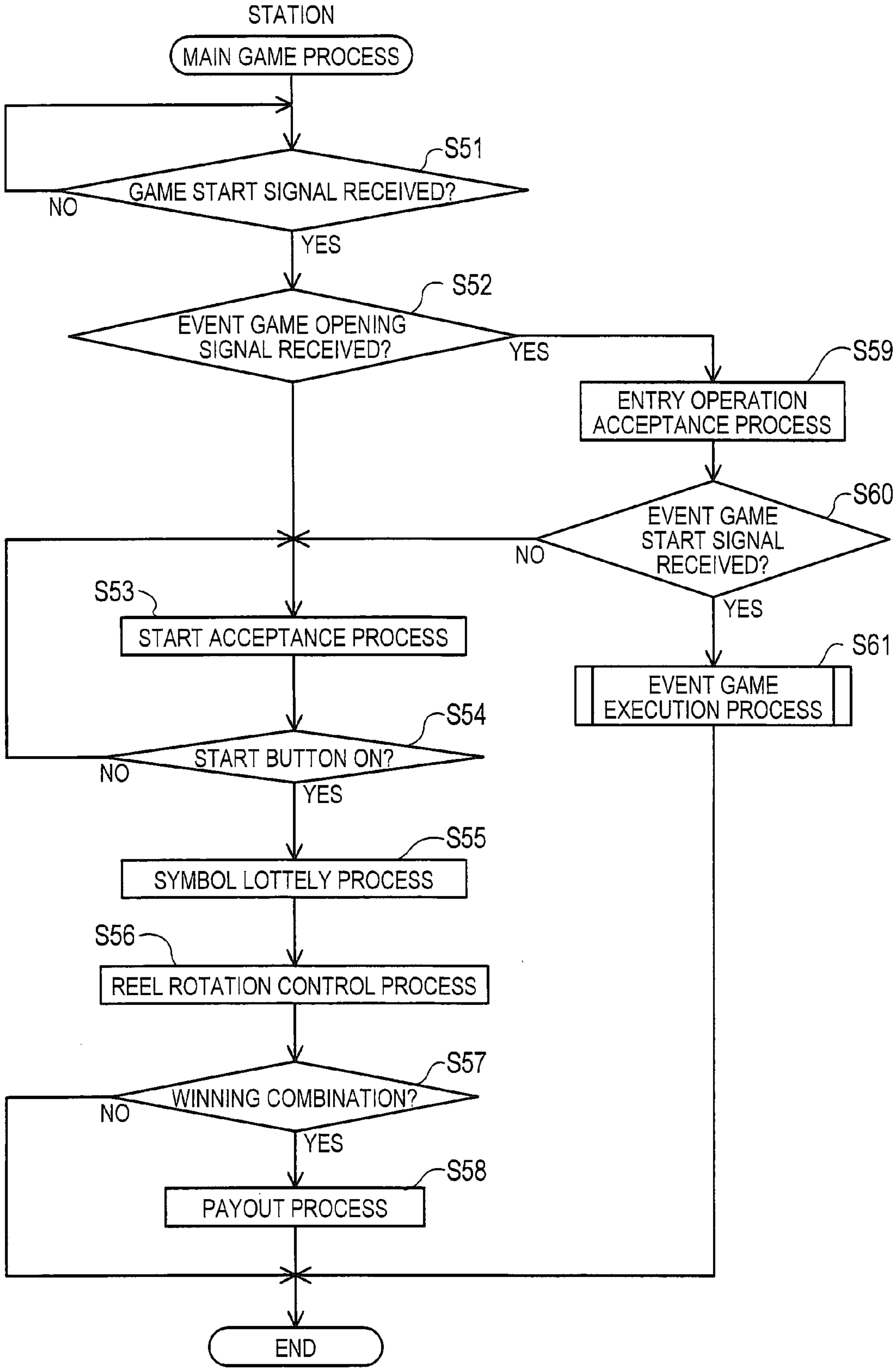
FIG. 13 is a flowchart of a main game process program according to one embodiment of the present invention.
Figure 16:
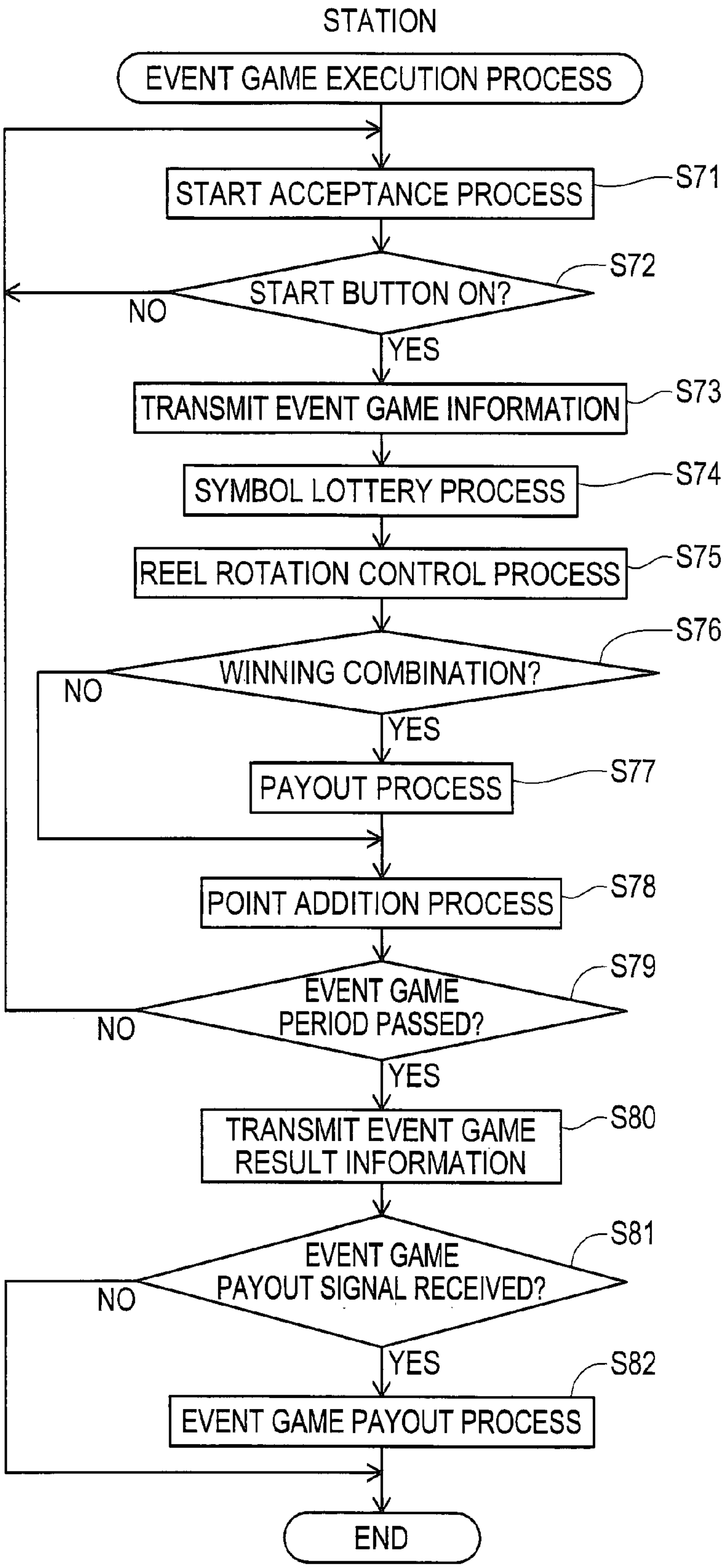
FIG. 16 is a flowchart of an event game execution process program according to one embodiment of the present invention.

As shown in FIG. 7, station 1 has a plurality of constituting elements, with a main control board 71 positioned as a core. The main control board 71 has a controller 41 for executing control programs and the like to be described later (FIG. 13 and FIG. 16). As was described in the above, the controller 41 functions as a processor in the present invention, together with the overall controller 91.

Controller 41 has a main CPU 42, a RAM 43 and a ROM 44. The main CPU 42 inputs/outputs signals to/from the other constituting elements through an I/O port 49 to execute a program stored in ROM 44. The main CPU 42 thus serves as the core for controlling station 1. RAM 43 temporarily stores data and programs to be used when the main CPU 42 is operational. For instance, RAM 43 temporarily stores random number values which were sampled by a sampling circuit 46 to be described later. ROM 44 stores permanent data and programs to be executed by the main CPU 42.

More particularly, the programs stored in ROM 44 include a game program and a game system program (hereinafter referred to as a game program, etc.). Further, this game program also includes a lottery program.

The lottery program serves to decide code numbers for each reel 5 through 7. These code numbers correspond to symbols each repositioned on the pay line L, as will be described later. This lottery program includes symbol weighting data. The symbol weighting data correspond to plural types of payout rate (e.g., 80%, 84% and 88%) respectively. The symbol weighting data show the correspondence relation between each code number and one or plural random numbers falling within a predetermined range of number with regard to the respective three reels 5 through 7.

The main control board 71 has the controller 41, a random number generation circuit 45, a sampling circuit 46, a clock pulse generation circuit 47 and a divider 48.

The random number generation circuit 45 operates in response to a command from the main CPU 42 to generate random numbers in a definite range. The sampling circuit 46 extracts an arbitrary random number from the random numbers generated by the random number generation circuit 45 in response to a command from the main CPU 42. The sampling circuit 46 inputs the extracted random numbers to the main CPU 42. The clock pulse generation circuit 47 generates a reference clock for activating the main CPU 42. Then, the divider 48 inputs a signal obtained by dividing the reference clock by a fixed period, to the main CPU 42.

A reel driving unit 50 is connected to the main control board 71. This reel driving unit 50 has a reel position detection circuit 51 and a motor driving circuit 52. The reel position detection circuit 51 detects the stop position for each one of the left reel 5, the center reel 6 and the right reel 7. The motor driving circuit 52 inputs a driving signal to motors M1, M2 and M3 which are connected to reels 5 through 7, respectively. Motors M1, M2 and M3 are activated in response to a driving signal inputted from the motor driving circuit 52. As a result, motors M1, M2 and M3 respectively spin reels 5 through 7, and stop them at a desired position.

A touch panel 18 is also connected to the main control board 71. This touch panel 18 identifies the coordinate position of the portion a player has touched. The touch panel 18 identifies where the player touched the panel and in which direction the touched location has moved based on the identified coordinate position information. The touch panel 18 inputs a signal corresponding to the identification results to the main CPU 42 through the I/O port 49.

Operation buttons 26 are also connected to the main control board 71. As was already described, the operation buttons 26 include a start button for instructing execution of the game, a collecting button, a BET button, etc. The buttons included in the operation buttons 26 each input an operation signal to the main CPU 42 through the I/O port 49 upon being held down.

A communication interface 68 is connected to the main control board 71. This communication interface 68 is employed during transmission and reception of different types of data (for instance, bet information, game results of the event game, etc.) between the station 1 and the overall controller 91.

The main control board 71 also has an illumination effect driving circuit 61, a hopper driving circuit 63, a payout completion signal circuit 65 and a display portion driving circuit 67.

The illumination effect driving circuit 61 outputs an effect signal with respect to the above-described light emitting portion 30 and the topper effect device 4. The topper effect device 4 is connected in series with the illumination effect driving circuit 61 through the light emitting portion 30. When an effect signal is received, the light emitting portion 30 and the topper effect device 4 emit light in a predetermined light emitting pattern. As a result, station 1 has an illumination effect in accordance with the progress of the game.

The hopper driving circuit 63 drives a hopper 64 based on the control of the main CPU 42. As a result, the hopper 64 performs a coin payout operation whereby coins are paid out to the coin tray 29. The display portion driving circuit 67 then controls display of the respective display portions including the payout amount display portion 19, the credit amount display portion 20 and the like.

As shown in FIG. 7, a coin detecting portion 66 is connected to the payout completion signal circuit 65. The coin detecting portion 66 measures the number of coins paid out by the hopper 64 and then inputs data on the measured amount of coins to the payout completion signal circuit 65. The payout completion signal circuit 65 judges whether a set number of coins has been paid out, based on the coin amount data inputted from the coin detecting portion 66. If the set number of coins has been paid out, the payout completion signal circuit 65 inputs a signal showing completion of coin payout to the main CPU 42.

As shown in FIG. 7, a sub-control board 72 is connected to the main control board 71. This sub-control board 72 is composed on a circuit board that differs from the main control board 71. The sub-control board 72 controls display of the upper liquid crystal panel 11A and the main liquid crystal panel 11B and controls sound output by speaker 31 based on a command inputted from the main control board 71.

The sub-control board 72 has a micro computer (hereinafter referred to as a sub-micro computer 73) as a main constituting element thereof. The sub-micro computer 73 has a sub-CPU 74, a program ROM 75, a work RAM 76, and I/O ports 77 and 80. The sub-CPU 74 performs a control operation in accordance with a control command transmitted from the main control board 71. The program ROM 75 stores a control program executed by the sub-CPU 74. The work RAM 76 is constituted as a temporary storage section for use when the above control program is executed by the sub-CPU 74.

The sub-control board 72 executes random number sampling upon an operation program of the sub-CPU 74. The sub-control board 72 carries out processes similar to those of the clock pulse generation circuit 47, the divider 48, the random number generation circuit 45 and the sampling circuit 46 provided on the main control board 71.

The sub-control board 72 also has a sound source IC 78, a power amplifier 79 and an image control circuit 81. The sound source IC 78 controls the sound outputted from the speaker 31. The power amplifier 79 amplifies the sound output. The image control circuit 81 operates as a display control section of the upper liquid crystal panel 11A and the main liquid crystal panel 11B.

The image control circuit 81 has an image control CPU 82, an image control work RAM 83, an image control program ROM 84, an image ROM 86, a video RAM 87 and an image control IC 88. The image control CPU 82 decides the image to be displayed on the upper liquid crystal panel 11A and the main liquid crystal panel 11B in accordance with the image control program and the parameters set in the sub-micro computer 73.

The image control program ROM 84 stores an image control program and different types of select tables relating to the display for the upper liquid crystal panel 11A and the main liquid crystal panel 11B. The image control work RAM 83 is a temporary storage section used when the image control program is executed in the image control CPU 82. The image control IC 88 forms images according to the contents decided by the image control CPU 82 and outputs these images to the upper liquid crystal panel 11A and the main liquid crystal panel 11B. The image ROM 86 stores dot data for forming images. The video RAM 87 functions as a temporary storage section for use when an image is formed by the image control IC 88.

Next, a description will be given on the base game and the event game executed in the gaming machine 100 according to the present embodiment.

First, the base game in the gaming machine 100 will be described. The base game is a slot game executed separately in each station 1. Specifically, the base game is a slot game in which a payout is acquired by repositioning a specific symbol combination on a pay line L of reels 5 through 7.

More specifically, when the base game starts, the player first operates the operation buttons 26 to set the number of bets. Then, when the player holds down the start button, reels 5 through 7 start spinning. The symbol columns drawn on the reels 5 through 7 are each scroll displayed in a downward direction in the display windows 15 through 17 each of which are in a transparent state (refer to FIG. 9).

When a predetermined time has lapsed, reels 5 through 7 each stop automatically in a predetermined sequence. As a result, portions of the symbol columns (three symbols in each reel, a total of 9 symbols) drawn on each of the reels 5 through 7 are respectively repositioned in the respective display windows 15 through 17 which are in a transparent state (refer to FIG. 10).

Here, in the base game, a payout amount is awarded when a predetermined type of winning combination is repositioned on the pay line L. The payout amount is calculated by multiplying the number of bets to the payout in accordance with the winning combination repositioned on the pay line L.

A unit game in the base game is composed of a series of processes ranging from betting of the gaming values to repositioning the symbols and payout (S53 through S58).

Next, the event game in the gaming machine 100 will be described. The event game according to the present embodiment is executed if predetermined conditions are satisfied. Here, the predetermined conditions include: "execution of a base game in a predetermined number of (for instance three) or more stations 1 (S14)", "non-execution of an event game during a predetermined time (S15)", "event game payouts are equal to or above a predetermined amount (S16)" and "an entry operation to the event game is made in a predetermined number of (for instance three) or more stations 1 (S19)". If these conditions are satisfied, the event game is executed.

In this event game, each one of a plurality (for instance, three or more) of stations 1 competes with the rest of the stations 1 for the superiority of game results in the event game. Accordingly, the event game corresponds to a game executed in common by a plurality (specifically, three or more) of stations 1.

The event game is constituted of a plurality of unit event games. Here, a unit event game is composed of processes (S71 through S78) almost the same as those of the unit game in the base game as mentioned in the above text. More specifically, in the event game, each station 1 can execute the unit event game any number of times as long as it is within the predetermined time (hereinafter referred to as event game period). Therefore, the event game is constituted of a plurality of unit event games executed during the event game period.

Similarly to the base game, the unit event game is independently executed in each station 1. Accordingly, the game results of the unit event game are in no way influenced by the game results of the other stations 1.

Here, when an entry to the event game is made, an entry fee is collected from the player through station 1. This entry fee represents the counter value for entering the event game. In the execution of a unit event game, the player bets gaming values at station 1 similarly to the execution of the unit game at the base game. At the start of this unit event game execution, a game charge is collected from the player through station 1. The game charge is a counter value to the execution of the unit event game. More specifically, the game charge is gaming values betted at the execution of the unit event game.

This unit event game has the same processes as those of the unit game in the base game as above mentioned. In other words, in the unit event game, there are processes of betting of gaming values (S71), scroll display of symbols (S75), reposition of symbols (S75) and awarding of the payout (S77). At this point, in the unit event game, a process of "event game point awarding" (S78) is executed besides the processes above. The "event game point awarding" is a process awarding an event game point based on the symbols repositioned on the pay line L. In the event game, a respective event game point is determined to each of symbol types (refer to FIG. 17).

Thus, the game result of the unit event game are the sum value of the event game points based on three symbols repositioned on the pay line L. As described in the above text, the event game is constituted of a plurality of unit event games. Therefore, the game results of the event game are obtained by summing up the game results of the unit event games executed a plurality of times in the station 1. Accordingly, the gaming machine 100 compares the game results of the event game in each station 1 with the total value of event game points acquired during the event game period. The station 1 with the best game results in the event game is then identified based on the results of this comparison.

Then, an event game payout is awarded in the event game with respect to the station 1 which obtained the best game results in the event game.

This event game payout is a progressive payout. Specifically, the event game payout is constituted by accumulating and adding the gaming values corresponding to a predetermined ratio of the number of bets made upon execution of the base game, and the collected entry fee.

Next, a detailed description will be given on the winning combinations and the associated payout amounts in the base game by referring to the drawings. FIG. 11 is an explanatory diagram of a payout table showing the winning combinations and the payout amount for each winning combination according to the present embodiment.

The payout amounts shown in FIG. 11 represent payout amounts for the case the number of bets is "1". If the number of bets is "2" or more, the amount to be paid is obtained by multiplying the respective number of bets by a payout amount as shown in FIG. 11.

For instance, if three blue seven symbols 90A are repositioned on the pay line L, an amount obtained by multiplying the number of bets by 1000 credits will be paid out.

If the three symbols repositioned on the pay line L are constituted of blue seven symbol 90 and red seven symbol 90B, an amount obtained by multiplying the number of bets by 80 credits will be paid out. In this case, the blue seven symbol 90A and the red seven symbol 90B included in the three symbols on the pay line L may be positioned in any pattern.

The payout amount for each winning combination shown in FIG. 11 is set in a similar manner. In this case, however, if the three symbols repositioned on the pay line L do not correspond to any of the winning combinations (refer to FIG. 11), the game is a losing. In this case, no payout is made.

Figure 12:
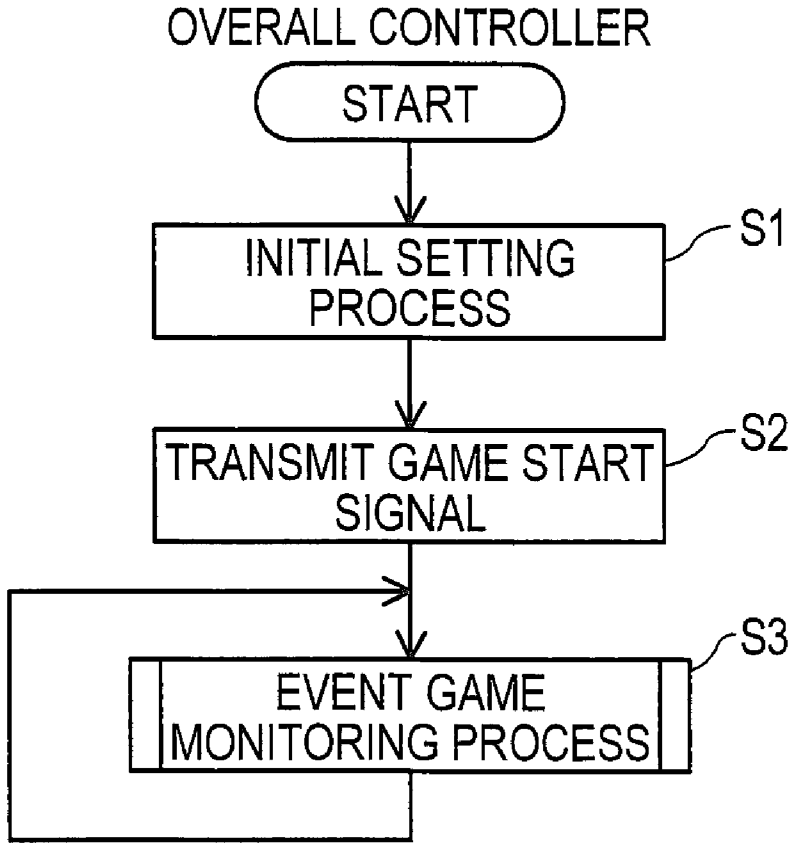
FIG. 12 is a flowchart of a main control process program according to one embodiment of the present invention.

Next, the main control program to be executed in the gaming machine 100 according to the present embodiment will be described in detail by referring to the drawings. FIG. 12 is a flow chart of the main control program.

This main control program controls the operation of the entire gaming machine 100. Accordingly, the main control program is executed by the overall control CPU 92 of the overall controller 91.

First, when the power-on switch of the gaming machine 100 is pressed (power is applied), the overall control CPU 92 executes an initial setting process (S1). When the gaming machine 100 is turned on, power is supplied to each station 1.

In this initial setting process (S1), the overall control CPU 92 executes initial setting of the overall controller 91 and the like, and at the same time transmits an initial setting signal to the main CPU 42 of each station 1.

Upon receiving this initial setting signal, each station 1 activates their main control board 71 and the sub-control board 72 to execute an initial setting. During the initial setting, the main CPU 42 of each station 1 executes the BIOS stored in ROM 44 to develop compressed data incorporated in the BIOS to the RAM 43. The main CPU 42 then executes the BIOS developed in the RAM 43 and diagnoses and initializes the various types of peripheral devices. Further, the main CPU 42 writes the game program, etc. from the ROM 44 to the RAM 43 to obtain payout rate setting data and country ID information. During the initial setting, the main CPU 42 also carries out an authentication process with respect to each program.

When the initial setting in each station 1 is completed, the overall control CPU 92 shifts the process to S2.

After shifting to S2, the overall control CPU 92 transmits a game start signal to each station 1. As will be described later, each station 1 can execute the base game and the event game upon receiving this game start signal. After the game start signal is transmitted to each station 1, the overall control CPU 92 shifts the process to S3.

After shifting to process S3, the overall control CPU 92 executes an event game monitoring process. In this event game monitoring process (S3), the overall control CPU 92 carries out an overall control process with respect to the execution of the event game, having as object the entire gaming machine 100. For instance, the overall control CPU 92 carries out an accumulation-addition of the event game payout, a process with respect to the start conditions and end conditions of the event game, and a process with respect to awarding the event game payout. This event game monitoring process (S3) will be described in detail later. When the event game monitoring process (S3) is completed, the overall control CPU 92 executes the event game monitoring process again.

Next, an event game monitoring process program to be executed by the overall control CPU 92 will be described in detail by referring to the drawings. FIG. 1 is a flow chart of the event game monitoring process program.

As shown in FIG. 1, when execution of the event game monitoring process program starts, the overall control CPU 92 first judges whether bet information was received (S11). This bet information shows the amount of gaming values (i.e., number of bets) that was bet upon execution of the slot game in each station 1. This bet information is transmitted from station 1 to the overall controller 91 by executing a start acceptance process (S53) to be described later. If the bet information was received (S11: YES), the overall control CPU 92 shifts the process to S12. On the other hand, if no bet information is received (S11: NO), the overall control CPU 92 shifts the process to S13.

After shifting to process S12, the overall control CPU 92 executes an event game payout renewal process. In the event game payout renewal process (S12), the overall control CPU 92 renews the contents of the event game payout information currently stored in the overall control RAM 94 based on the received bet information. More specifically, the overall control CPU 92 accumulates and adds the gaming values for a predetermined ratio (for instance, 2%) of the number of bets indicated in the bet information with the actual event game payout. After the information with respect to the event game payout stored in the overall control RAM 94 is renewed, the overall control CPU 92 shifts the process to S13.

After shifting to process S13, the overall control CPU 92 judges whether the event game is being executed in the gaming machine 100. More specifically, the overall control CPU 92 references timer 97 to judge whether the gaming machine 100 is within an event game period. If the event game is being executed (S13: YES), the overall control CPU 92 shifts the process to S22. In this case, the overall control CPU 92 monitors and controls the being-executed event game (S22 through S27). On the other hand, if the event game is not being executed (S13: NO), the overall control CPU 92 shifts the process to S14. In this case, the overall control CPU 92 monitors and controls the start of the event game (S14 through S21).

At S14, the overall control CPU 92 judges whether a predetermined number (for instance, three) or more stations 1 are operating. In other words, the overall control CPU 92 judges whether the base game is being executed in a predetermined number or more stations 1. More specifically, the overall control CPU 92 identifies the station 1 in which the base game is being executed based on the bet information received during a predetermined time (for instance, 5 minutes) and then makes the judgment of S14. If a predetermined number or more stations 1 are operating (S14: YES), the overall control CPU 92 shifts the process to S15. On the other hand, if the number of stations 1 which are operating is below a predetermined number (S14: NO), the overall control CPU 92 ends the event game monitoring process program as is.

At S15, the overall control CPU 92 judges whether an interval period has lapsed. The interval period is a predetermined time from the end of the previous event game. Accordingly, at S15, the overall control CPU 92 references timer 97 to judge whether the time in which an event game was not executed is equal to or longer than a predetermined time. If the interval period has lapsed (S15: YES), the overall control CPU 92 shifts the process to S16. On the other hand, if the interval period has not lapsed (S15: NO), the overall control CPU 92 ends the event game monitoring process program as is.

After shifting to S16, the overall control CPU 92 references the overall control RAM 94 to determine whether the event game payout is equal to or above a predetermined amount. As was described in the above text, the event game payout is a progressive payout. Accordingly, the event game payout is renewed as needed through the above described event game payout renewal process (S12). If the event game payout is equal to or above a predetermined amount (S16: YES), the overall control CPU 92 shifts the process to S17. On the other hand, if the event game payout is below a predetermined amount (S16: NO), the overall control CPU 92 ends the event game monitoring process program as is.

At S17, the overall control CPU 92 transmits an event game opening signal with respect to the stations 1 which are operating at present (i.e., which are executing a base game). After transmitting the event game opening signal, the overall control CPU 92 shifts the process to S18. As will be described later, upon receiving the event game opening signal, the main CPU 42 of the station 1 executes an entry operation acceptance process (S59). Here, the main CPU 42 informs the player about the necessity of an entry fee and a game charge for playing an event game. In this case, the player of the above station 1 can perform an entry operation with respect to the event game.

At S18, the overall control CPU 92 receives the event game entry signal. The event game entry signal shows that entry to the event game is made. The event game entry signal is transmitted from the station 1 to which entry was made through the entry operation acceptance process (S59). The overall control CPU 92 receives the event game entry signal from station 1 during a predetermined time. After the predetermined time has lapsed, the overall control CPU 92 shifts the process to S19.

After shifting to S19, the overall control CPU 92 determines whether a predetermined number of (for instance, three) or more stations 1 enter the event game. More specifically, the overall control CPU 92 identifies the stations 1 which enter the event game based on the event game entry signal. As a result, the overall control CPU 92 can judge the number of stations 1 entering the event game, thereby carrying out the judgment process at S19. If the number of stations entering the event game is equal to or above a predetermined number (S19: YES), the overall control CPU 92 shifts the process to S20. On the other hand, if the number of stations 1 entering the event game is below a predetermined number (S19: NO), the overall control CPU 92 ends the event game monitoring process program as is.

At S20, the overall control CPU 92 executes an entry fee collection process. In an entry fee collection process (S20), the overall control CPU 92 collects the entry fee from stations 1 which performed an entry operation. The entry fee represents the counter value for entering the event game, and is collected as gaming value (credits). After collecting the entry fee from each station 1 entering the event game and executing the above process, the overall control CPU 92 shifts the process to S21.

After shifting to S21, the overall control CPU 92 transmits the event game start signal with respect to the stations 1 which performed the entry operation. Simultaneously with the transmission of the event game start signal, the overall control CPU 92 references timer 97 and stores information showing the event game start time in the overall control RAM 94. After transmitting the event game start signal, the overall control CPU 92 ends the event game monitoring process program. As will hereinafter be described, the main CPU 42 starts an event game upon receiving this event game start signal. As a result, the stations 1 having performed the entry operation are set in a condition where the event game (unit event game) can be executed.

Here, if the event game is executed (S13: YES), the overall control CPU 92 performs the judgment process at S22. At S22, the overall control CPU 92 judges whether the event game information has been received. The event game information is the information with respect to a game charge collected at every unit event game. Namely, the event game information includes the information indicating the amount of gaming values (credits) betted at the unit event game. The station 1 entering the event game transmits event game information each time the station 1 executes a unit event game. If the event game information is received (S22:YES), the overall control CPU 92 shifts the process to S23. Meanwhile, if the event game information is not received, the overall control CPU 92 shifts the process to S24.

At S23, the overall control CPU 92 executes a game charge collection process. In this game charge collection process (S23), the overall control CPU 92 collects from station 1 having transmitted the event game information the game charge (i.e., gaming value) indicated by the event game information thereof. Also, in the game charge collection process (S23), the overall control CPU 92 accumulates and adds the collected game charges to the event game payout. After accumulating and adding the collected game charges to the event game payout, the overall control CPU 92 shifts the process to S24.

After shifting to S24, the overall control CPU 92 judges whether the event game period has lapsed. More specifically, the overall control CPU 92 references the information for the event game start time stored in the overall control RAM 94 and timer 97 to judge whether the predetermined event game period has lapsed. If the event game period has lapsed (S24: YES), the overall control CPU 92 shifts the process to S25. On the other hand, if the event game period has not lapsed yet (S24: NO), the overall control CPU 92 ends the event game monitoring process program as is.

At S25, the overall control CPU 92 transmits an event game end signal to station 1 as the event game period has lapsed. The event game end signal serves to show the end of the event game. After the event game end signal is transmitted to station 1, the overall control CPU 92 shifts the process to S26.

Upon receiving the event game end signal, the main CPU 42 of station 1 executes processes (S80 through S82) with respect to ending of the event game.

At S26, the overall control CPU 92 executes an event game result judgment process. This event game result judgment process (S26) serves to identify the station 1 with the best event game results based on the event game results of each station 1 which entered the event game.

More specifically, in the event game result judgment process (S26), the overall control CPU 92 first receives event game result information from each station 1 which entered the event game. The event game result information is transmitted from stations 1 which received the event game end signal (S80). As was described in the above text, the event game result information shows a sum value of the event game points acquired during the event game period. Accordingly, the overall control CPU 92 identifies the station 1 which acquired the most event game points (i.e., the station which obtained the best game result) based on the event game result information of each station 1. After identifying the station which obtained the best event game result, the overall control CPU 92 shifts the process to S27.

At S27, the overall control CPU 92 transmits an event game payout signal. This event game payout signal instructs an event game payout and includes the event game payout information at the end of the event game. The event game payout signal is transmitted to the station identified at the event game result judgment process (S26). After transmitting the event game payout signal, the overall control CPU 92 initializes the event game payout information stored in the overall control RAM 94. After executing the transmittance of the event game payout signal and the initialization of the event game payout, the overall control CPU 92 ends the event game monitoring process program.

Next, the main game process program executed in each station 1 constituting the gaming machine 100 will be described in detail by referring to the drawings. FIG. 13 is a flow chart of the main game process program executed in station 1.

The game in station 1 according to the present embodiment (specifically, the base game, the event game) is realized by executing the main game process program. The main game process program is repeatedly executed during power supply to station 1.

In the following description, each station 1 has already ended initial setting for each station 1 following reception of the initial setting signal transmitted from the overall control CPU 92.

As shown in FIG. 13, after starting execution of the main game process program following the completion of the initial setting, the main CPU 42 judges whether a game start signal is received (S51). This game start signal is transmitted from the overall controller 91 (S2). If a game start signal is received (S51: YES), the main CPU 42 shifts the process to S52. On the other hand, if the game start signal is not yet received (S51: NO), the main CPU 42 puts the process in standby. Specifically, station 1 maintains the standby state until a game start signal is received.

At S52, the main CPU 42 judges whether an event game opening signal was received. This event game opening signal is transmitted if the conditions (S14 through S16) for the event game are satisfied (S17). As was described in the above text, the event game opening signal is transmitted by the overall control CPU 92. If the event game opening signal is received (S52: YES), the main CPU 42 shifts the process to the entry operation acceptance process (S59). As a result, the above station 1 executes the processes relating to the execution of the event game (S59 through S61). On the other hand, if the event game opening signal is not received (S52: NO), the main CPU 42 shifts the process to S53. In this case, the above station 1 executes the processes (S53 through S58) relating to the execution of the base game.

First, the processes (S53 through S58) relating to the execution of the base game in the main game process program will be described. At S53, the main CPU 42 executes a start acceptance process. In the start acceptance process (S53), the main CPU 42 accepts a bet operation from the player. Specifically, the above bet operation is carried out by inserting a coin or operating the BET button. In the start acceptance process, the main CPU 42 transmits a control signal to the sub-control board 72. As a result, the display windows 15 through 17 of the main liquid crystal panel 11B each shift to or are maintained in a transparent state by the sub-control board 72.

After shifting to S54, the main CPU 42 judges whether the start button was operated. More specifically, the main CPU 42 makes the judgment at S54 based on the presence or absence of a signal based on the input operation of the start button.

If the start button was operated (S54: YES), the main CPU 42 executes the predetermined process and shifts the process to S55. More specifically, the main CPU 42 stores the number of bets set in the start acceptance process (S53) in RAM 43 as the bet information and then transmits this bet information to the overall controller 91. As described above, the overall control CPU 92 executes a payout information renewal process (S12) based on the bet information transmitted herein. The main CPU 42 also subtracts the number of bets according to this bet information from the number of credits.

On the other hand, if the start button is not operated (S54: NO), the main CPU 42 returns the process to the start acceptance process (S53). Accordingly, the player can execute a bet number correction operation, etc.

In the next process S55, the main CPU 42 executes the symbol lottery process. This symbol lottery process (S55) serves to decide the symbols positioned on the main liquid crystal panel 11B by lottery. More concretely, the main CPU 42 executes the above lottery program to sample a random number value from the numerical range of a predetermined random number value range. The main CPU 42 decides each symbol (i.e., the stop position of reels 5 through 7) positioned on the pay line L based on the sampled random number values and the table.

Here, a process using the random number values in the symbol lottery process (S55) will be described based on the drawings. FIG. 14 is one example of a table showing associations between the symbols drawn on one reel band and code numbers. FIG. 15 is one example of a table showing the association between random number values and code numbers. The table showing associations between symbols and code numbers (for instance, FIG. 14) contains associations with respect to the left reel 5, the center reel 6 and the right reel 7.

As was described in the above text, in the symbol lottery process (S55), the main CPU 42 executes the lottery program to sample random number values from the predetermined random number range (for instance 0 through 65535). The main CPU 42 then decides the code numbers based on the sampled random number values and the table containing associations between the random number values and the code numbers (refer to FIG. 15, for instance). The main CPU 42 decides the symbols to be positioned on the pay line L among the symbols included on the reels, based on the code numbers and the table containing associations between the symbols and the code numbers (refer to FIG. 14). As a result, the main CPU 42 can decide a symbol combination constituted by three symbols positioned on the pay line L.

For instance, if the left reel 5 is the reel band shown in FIG. 14 and random number value "1136" is sampled, the main CPU 42 decides for code number "08" based on the random number value "1136" and the table shown in FIG. 15. Then, the main CPU 42 decides the symbol positioned on the pay line L in display window 15 to be the bar symbol 90E based on the code number "08" and the table shown in FIG. 14.

The process using random number values in the symbol lottery process (S55) is not limited to the process using random number values, a table containing associations between random number values and code numbers (refer to FIG. 15, for instance) and a table containing associations between symbols and code numbers (refer to FIG. 14).

For instance, direct associations can be made between random number values to be sampled and symbols. The symbols to be stopped and displayed can also be decided using direct associations between the random number values to be sampled and winning combinations and the above tables.

The processes following the symbol lottery process (S55) in the main game process program will now be described by referring to FIG. 13.

After the symbol lottery process (S55) ends, the main CPU 42 executes a reel rotation control process (S56). More specifically, the main CPU 42 drives motors M1, M2 and M3 through a motor driving circuit 52. As a result, reels 5 through 7 start spinning. Thereafter, the main CPU 42 decides the effect pattern with respect to the unit game (the image display pattern onto the main liquid crystal panel 11B and the sound output pattern from speaker 31) and transmits an effect signal to the sub-control board 72, etc. Station 1 then starts effect execution using the decided effect pattern based on the control of the sub-control board 72. When the predetermined time has lapsed, the main CPU 42 performs a reel stop operation. Specifically, the main CPU 42 stops reels 5 though 7 through the motor driving circuit 52. At this time, the main CPU 42 stops reels 5 through 7 based on a code number decided in the symbol lottery process (S55). As a result, the symbol combination decided at S55 is repositioned on the pay line L. The main CPU 42 ends the reel rotation control process (S56) following stopping of reels 5 through 7 and then shifts the process to S57.

After shifting to S57, the main CPU 42 judges whether the predetermined winning combination (refer to FIG. 11) is established on the pay line L. More specifically, the main CPU 42 judges whether the symbol combination repositioned on the pay line L corresponds to the winning combination based on the code numbers, etc. of reels 5 through 7. If the winning combination is established (S57: YES), the main CPU 42 moves the process to the payout process (S58). On the other hand, if the winning combination is not established (S57: NO), the main CPU 42 ends the main game process program. In this case, if a game starts following the next game, the main CPU 42 executes the processes following process S51 once again.

At S58, the main CPU 42 executes a payout process. In this payout process (S58), the main CPU 42 pays out an award (i.e., a payout) corresponding to the associated winning combination to the player. A payout method can be adopted in which coins corresponding to the number of credits (1 credit corresponds to 1 coin) are paid out when the CASHOUT button is held down. A payout method can also be adopted in which payment is made by tickets with a bar code. After ending the payout process (S58), the main CPU 42 ends the main game process program. In this case, the main CPU 42 starts execution of the main game process program again, and executes the process at S51.

The processes S53 through S58 constitute a single unit game executed in the base game.

Next, the processes (S59 through S61) regarding execution of the event game in the main game process program will be described. As was described in the above text, if an event game opening signal is received (S52: YES), the main CPU 42 shifts the process to S59.

At S59, the main CPU 42 executes an entry operation acceptance process. In this entry operation acceptance process (S59), the main CPU 42 accepts the operation of a player showing entry to the event game (i.e., entry operation). The operation of the player showing entry was not made to the event game is referred to as non-entry operation.

More specifically, the main CPU 42 displays "a message urging entry to the event game" and "a message that an entry fee and a game charge are required when executing the event game" on the main liquid crystal panel 11B.

Further, the main CPU 42 displays a selection on the main liquid crystal panel 11B with respect to entry to the event game (i.e., "select: entry" and "select: non-entry"). Accordingly, a player playing at station 1 can judge whether to enter the event game or not, appropriately. And the player can carry out the entry operation or the non-entry operation.

The entry operation and the non-entry operation are carried out using the touch panel 18. Specifically, the player executes the entry operation by touching the touch panel 18 corresponding to the "select: entry" portion. The player executes the non-entry operation by touching the touch panel 18 at the "select: non-entry" portion. If the entry operation was executed, the main CPU 42 transmits an event game entry signal to the overall controller 91. After transmitting the event game entry signal, the main CPU 42 shifts the process to S60.

If the non-entry operation was carried out, the main CPU 42 transmits the event game non-entry signal to the overall controller 91. In this point, however, a method can be adopted in which no signal is sent to the overall controller 91 when a non-entry operation is executed.

After shifting to S60, the main CPU 42 judges whether the event game start signal was received. The event game start signal serves to start the event game. As was described in the above text, the event game start signal is transmitted from the overall controller 91 to the station 1 which performed the entry operation, if the predetermined conditions (S14 through S16, and S19) are satisfied. If the main CPU 42 receives the event game start signal (S60: YES), it shifts the process to the event game execution process (S61). In this case, the above station 1 performs specific processes with respect to execution of the event game. On the other hand, if the main CPU 42 does not receive the event game start signal (S60: NO), it shifts the process to S53. In this case, the above station 1 executes processes (S53 through S58) relating to execution of the base game. Specifically, the above station 1 does not execute the event game.

After shifting to S61, the main CPU 42 executes the event game execution process. This event game execution process (S61) serves to execute a unit event game in the above station 1 independently from the other stations 1. In this event game execution process (S61), the main CPU 42 executes the event game execution process program. The event game execution process program will be described in detail by referring to the drawings. Therefore the detailed description concerning the event game execution process program (S61) is skipped here. After ending the event game execution process (S61), the main CPU 42 ends the main game process program. In this case as well, the main CPU 42 starts execution of the main game process program again, and executes the process at S51.

Next, the event game execution process program executed by the main CPU 42 at S61 will be described in detail by referring to the drawings. FIG. 16 is a flow chart of the event game execution process program.

After shifting to the event game execution process (S61), the main CPU 42 first executes the start acceptance process (S71) with respect to the unit event game. In this start acceptance process (S71), the main CPU 42 executes a similar process to the start acceptance process (S53) with respect to the base game. The start acceptance process (S53) has already been described, therefore the detailed description concerning the start acceptance process (S71) is skipped here.

After shifting to S72, the main CPU 42 judges whether the start button has been operated or not. This judgment process of S72 is similar to the judgment process of S54 with respect to the base game. Therefore, the detailed description concerning the judgment process of S72 is skipped here. If the start button is operated (S72: YES), the main CPU 42 shifts the process to S73. Meanwhile, if the start button is not operated (S72: NO), the main CPU 42 returns the process to S71. Accordingly, the player can execute a bet number correction operation, etc. directed to the unit event game.

At S73, the main CPU 42 transmits the event game information to the overall controller 91 based on the operation of the start button. This process of S73 is basically the same process as the bet information transmittance process in the base game. After transmitting the event game information, the main CPU 42 shifts the process to S74.

As mentioned in the above text, the event game information includes the information concerning the gaming value (credit) amount betted at the unit event game. In other words, the event game information is information concerning the game charge collected at every unit event game.

After transmitting the event game information, the main CPU 42 subtracts the bet number set at the start acceptance process (S71) from the player's credit. When receiving the event game information, the overall control CPU 92 collects the game charge (gaming values betted at a unit event game) indicated in the event game information (S23). The overall control CPU 92 accumulates and adds all the collected game charges to the event game payout. The gaming machine 100 directed to this embodiment thus collects the game charge accompanying the unit event game execution.

At S74, the main CPU 42 executes the symbol lottery process. This symbol lottery process (S74) is similar to the symbol lottery process (S55) in the base game. Therefore the detailed description concerning the symbol lottery process (S74) is skipped here. After determining the symbol combination to be positioned on the pay line L in the unit event game, the main CPU 42 shifts the process to S75.

At S75, the main CPU 42 executes the reel rotation control process. This reel rotation control process (S75) is similar to the reel rotation control process (S56) in the base game. Accordingly, the symbols are scroll displayed by rotation of the reels in the display windows 15, 16 and 17 in the unit event game similarly to the unit game in the base game (refer to FIG. 9). By the reel rotation stop based on the lapse of the predetermined period, the symbols are repositioned based on the lottery results of the symbol lottery process (S74). After repositioning the symbols based on the lottery results, the main CPU 42 shifts the process to S76.

After shifting to S76, the main CPU 42 judges whether the predetermined winning combination is established on the pay line L. In other words, the main CPU 42 judges whether the symbol combination repositioned on the pay line L corresponds to the winning combination. This judgment process of S76 is similar to the judgment process of S57 in the base game. Therefore the detailed description concerning the judgment process of S76 is skipped here. If the winning combination is established (S76: YES), the main CPU 42 moves the process to S77. On the other hand, if the winning combination is not established (S76: NO), the main CPU 42 shifts the processes to S78.

At S77, the main CPU 42 executes a payout process. The payout process (S77) serves to pay out the payout directed to the unit event game. Accordingly, the main CPU 42 pays out an award based on the bet number (game charge) set at the start acceptance process (S71), the lottery result of the symbol lottery process (S75) and the payout reference table (refer to FIG. 11). After paying out the award (payout) in the unit event game, the main CPU 42 shifts the process to S78.

After shifting to S78, the main CPU 42 executes the point addition process. This point addition process (S78) serves to judge the event game points composing the game results of the unit event game and determine the game results of the event game. More specifically, the main CPU 42 calculates the game result (i.e., event game points) for the unit event game having as object three symbols positioned on the pay line L.

Here, the calculation of event game points in the unit event game will be described in detail by referring to the drawings. Upon calculating the event game points, the main CPU 42 references the lottery results of the symbol lottery process (S74) and the event game point table shown in FIG. 17. As shown in FIG. 17, the event game point table contains event game points set for each type of symbol. For instance, the red seven symbol 90B is associated with "50 points".

Figure 10:
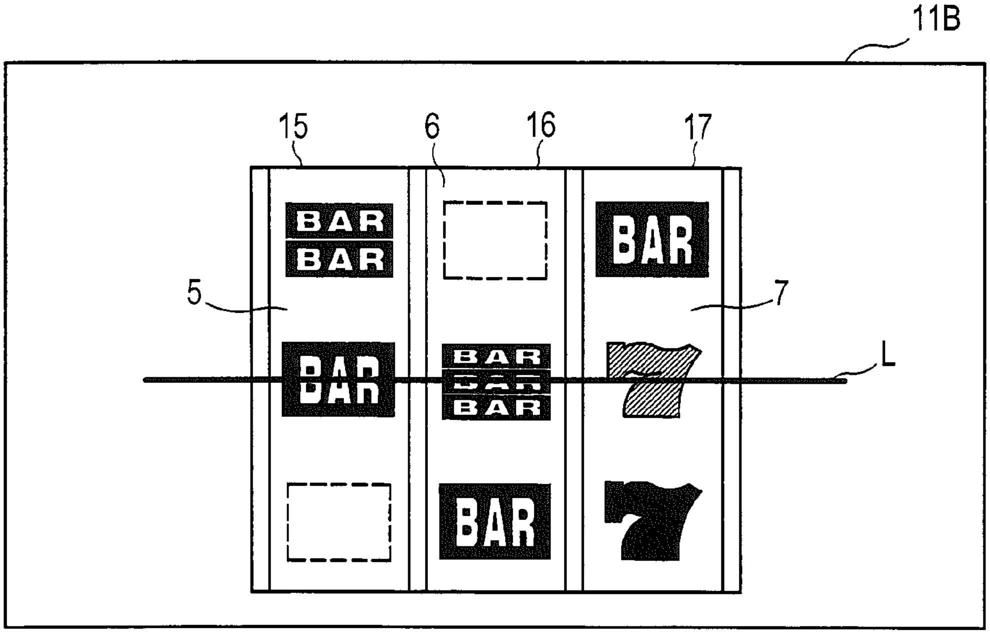
FIG. 10 is an explanatory view showing a display example of a main liquid crystal panel with repositioned symbols thereon according to one embodiment of the present invention.

Here, calculation of the event game points for the unit event game will be described taking as example the case that symbols are repositioned in the manner shown in FIG. 10. In the case shown in FIG. 10, "bar symbol 90E", "triple bar symbol 90C" and "red seven symbol 90B" are positioned on the pay line L. Accordingly, these three symbols become the object for calculating the event game points in the above unit event game.

Then, as shown in FIG. 17, "10 points" are associated to the "bar symbol 90E" and "30 points" are associated to the "triple bar symbol 90C". Accordingly, the total number of event game points for the unit event game in this case is "90 points" which adds up "10 points", "30 points" and "50 points".

The event game points of the unit event game calculated as shown above are added to the present event game points as needed. Specifically, the player can obtain even higher event game points with the execution of the unit event game. After adding the event game points for the current unit event game to the present event game points, the main CPU 42 ends the point addition process (S78). After ending the point addition process (S78), the main CPU 42 shifts the process to S79.

The unit event game according to the present embodiment is realized by executing the processes from S71 through S78.

After shifting to S79, the main CPU 42 judges whether the event game period has lapsed. More specifically, the main CPU 42 judges whether the event game end signal was received. As was described in the above text, the event game end signal is transmitted from the overall control CPU 92 if the event game period has lapsed. Accordingly, the main CPU 42 can judge whether the event game period has lapsed by judging whether the event game end signal was received. If the event game period has lapsed (S79: YES), the main CPU 42 shifts the process to S80. On the other hand, the main CPU 42 returns the process to S71 if the event game period has not lapsed yet (S79: NO). As a result, the player can execute a new unit event game. Specifically, the player can play the unit event game a plurality of times as long as it is within the event game period.

At S80, the main CPU 42 transmits the event game result information to the overall controller 91. This event game result information shows the game results for the current event game (specifically, at the time of ending the event game). Specifically, the above event game result information includes information showing the total value of the event game points obtained in the current event game. Then, as mentioned in the above text, the above event game result information is used as judging reference for identifying the station 1 that obtained the best event game results (S26). After transmitting the event game result information to the overall controller 91, the main CPU 42 shifts the process to S81.

After shifting to S81, the main CPU 42 judges whether the event game payout signal was received. The event game payout signal serves to instruct an event game payout with respect to the above station 1. The above event game payout signal includes information showing the event game payout amount at the end of the event game. The event game payout signal is transmitted from the overall controller 91 to the station 1 that obtained the best event game results based on the judgment results in the event game results judgment process (S26). Specifically, if the above station 1 is the station 1 that obtained the best event game results, the main CPU 42 receives the event game payout signal. If the event game payout signal received (S81: YES), the main CPU 42 shifts the process to S82. On the other hand, if no event game payout signal received (S81: NO), the main CPU 42 ends the event game execution process program as is. In this case, the player of the above station 1 cannot obtain an event game payout in the current event game.

At S82, the main CPU 42 executes the event game payout process. In this event game payout process (S82), the main CPU 42 awards an event game payout based on the event game payout signal to the player. As a result, the player that obtained the best event game results obtains an event game payout which is a progressive payout. After ending the event game payout process (S82), the main CPU 42 ends the event game execution process program.

As was described in the above text, in the gaming machine 100 according to the present embodiment, the five stations 1 execute the base game (S53 through S58) independently from each other. In this base game, each station 1 decides one game result (i.e., symbol combination) (S55), and executes the base game.

At this time, the above station 1 is not influenced in any way by the other stations 1.

Here, the event game is executed in the above gaming machine 100 if the predetermined conditions (S14 through S16, and S19) are satisfied. In the above event game, the players playing at a plurality (for instance, three or more) of stations 1 compete to obtain an event game payout. The event game is constituted by a plurality of unit event games executed during the event game period. Specifically, the game results of the event game are obtained by summing up the results of the unit event games executed within an event game period. The event game payout is a progressive payout and is awarded to players that obtained the best game results in the event game.

As a result, the above gaming machine 100 can provide new interest to the player which differs from the base game by enabling execution of the event game.

Also, in the unit event game, each station 1 determines (S74) the game result (three symbols on the pay line L) independently with each other similarly to the unit game in the base game, and conducts the unit event game (S71 through S78). Here, when executing the unit event game, the gaming machine 100 collects the game charge (the bet number to the unit event game) from stations entering the unit event game (S23, S71 through 73). This game charge represents the counter value for executing the unit event game. As a result, the gaming machine 100 can collect the game charge as the counter value for executing the unit event game at each occasion of the unit event game.

Figure 18:
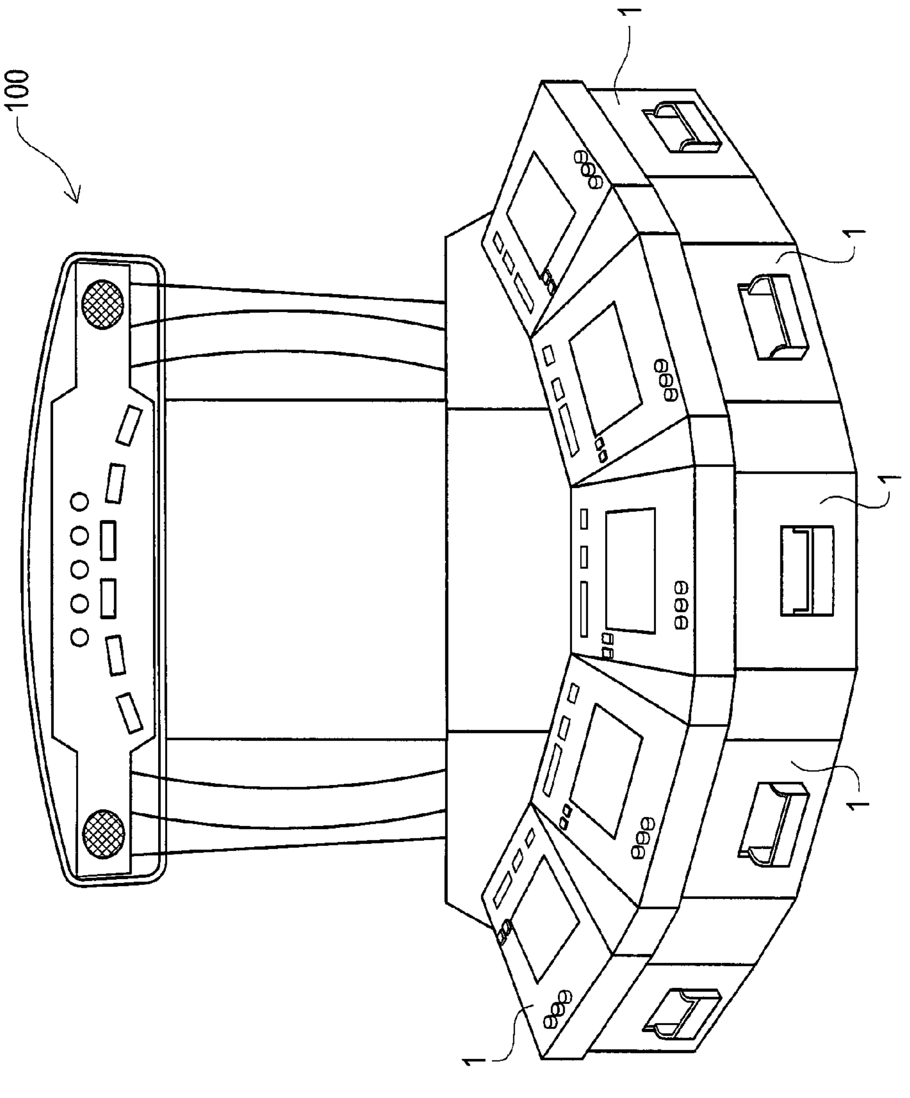
FIG. 18 is an external view of a gaming machine according to one embodiment of the present invention.

It is to be noted that the present invention is not limited to the above-described embodiment but, not to mention, it can be improved and modified in various ways within its scope and without departing from the subject matter thereof. For instance, the present invention can also be realized as a gaming machine of the type shown in FIG. 18.

In the above description, in the gaming machine 100 according to the present embodiment, each station executes a base game and an event game having a slot game as base, however, the present invention is not limited to this aspect. Specifically, the present invention can be realized by executing a base game and an event game having a card game such as poker or black jack, etc. as base.

Further, in the above description, the gaming machine 100 according to the present embodiment executes a base game and an event game having the same type of game (slot game in the case of the present embodiment) as base, however, the invention is not limited to this aspect. Specifically, the base game and the event game may also have as base a game of a different type. For instance, a "slot game" can be adopted as a base game, and a "card game" can be adopted as an event game. In this case, the event game has to satisfy conditions such as "stations 1 that entered the game can advance the unit event game independently" and "the plurality of stations that entered the game compete for a common award".

In the above embodiment, event game points based on three symbols positioned on the pay line L represent game results for the unit event game, however, the present invention is not limited to this aspect. For instance, nine symbols which can be visually recognized through the respective display windows 15, 16 and 17 may represent event game point calculation objects and may also represent game results of the unit event game.

Furthermore, in the present embodiment, the start acceptance process (S71) in the event game is composed to allow the setting of the bet number freely, in the same manner as the base game (S53), however, the present invention can be realized by constantly setting a predetermined bet number (for instance, the bet number "3").

In the present embodiment, the game charge collected from each station 1 is added to the event game payout, but this invention is not limited to this aspect. Namely, the present invention does not limit the use of the collected game charge. For instance, it can be made to compose a part of event game payout, or to be the profit of the gaming machine 100.

The station 1 according to the present embodiment is a slot machine executing a slot game using three mechanical reels, however, it may also execute a slot game using five reels or nine reels, etc. A slot machine having video reels may also be used.

The present invention can be realized as a game method for executing the above processes. Further, the present invention can also be realized as a program for executing the above game method on a computer and a recording medium onto which this program is recorded.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A gaming machine comprising:

plural stations each of which determines a game result and executes a game independently; and a processor which executes:

(a) a process to execute a base game independently at each station;

(b) a process to accept each station's entry to an event game executed in common to the plural stations and consisting of a plural number of unit games when a predetermined condition is satisfied;

(c) a process to collect an entry fee in exchange for the entry to the event game when accepting the entry to the event game;

(d) a process to collect a game charge in exchange for an execution of a unit game by each start of the unit games which compose the event game, from a station of which entry to the event game has been accepted;

(e) a process to accumulatively add part of the collected game charge to event game payout to be awarded at the event game as often as collecting a game charge in exchange for an execution of the unit game;

(f) a process to execute a unit game included in the event game in a station of which game charge has been collected;

(g) a process to identify a station entitled to receive the event game payout at a moment of finishing the event game, based on an event game result of each station that has participated to the event game when the event game is finished with execution of the plural number of unit games; and (h) a process to award to the station currently identified the event game payout obtained at a moment of finishing the event game.

2. The gaming machine according to claim 1, wherein the processor executes a process to accept each station's entry to the event game when stations equal to or more than a predetermined number are executing base games among the plural stations.

3. A gaming machine comprising:

plural stations each of which determines a game result and executes a game independently;

a processor; and a timer connected to the processor;

wherein the processor executes:

(a) a process to execute a base game independently at each station;

(b) a process to accept each station's entry to an event game executed in common to the plural stations and consisting of a plural number of unit games when a predetermined condition is satisfied;

(c) a process to collect an entry fee in exchange for the entry to the event game when accepting the entry to the event game;

(d) a process to start timing by the timer when starting the event game concerning each station of which entry to the event game has been accepted;

(e) a process to collect a game charge in exchange for an execution of a unit game by each start of the unit games which compose the event game, from a station of which entry to the event game has been accepted;

(f) a process to accumulatively add part of the collected game charge to event game payout to be awarded at the event game as often as collecting a game charge in exchange for an execution of the unit game;

(g) a process to execute a unit game included in the event game in a station of which game charge has been collected;

(h) a process to determine a predetermined event game period during which the event game is executed has been elapsed, based on a timing result of the timer;

(i) a process to identify a station entitled to receive event game payout at a moment of finishing the event game, based on an event game result of each station that has participated to the event game when the event game is finished in response to elapse of the predetermined event game period; and (j) a process to award to the station currently identified the event game payout obtained at a moment of finishing the event game.

* * * * *